(12) United States Patent
Hessler et al.

(10) Patent No.: US 10,764,910 B2
(45) Date of Patent: Sep. 1, 2020

(54) LISTEN-BEFORE-TALK PERIOD FOR SLOTTED ACCESS WITH SCHEDULED TRAFFIC

(71) Applicant: Telefonaktiebolaget L M Ericsson (publ), Stockholm (SE)

(72) Inventors: Martin Hessler, Linköping (SE); Erik Eriksson, Linköping (SE); Pål Frenger, Linköping (SE); Jonas Fröberg Olsson, Ljungsbro (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 800 days.

(21) Appl. No.: 14/902,507

(22) PCT Filed: Nov. 30, 2015

(86) PCT No.: PCT/SE2015/051284
§ 371 (c)(1),
(2) Date: Dec. 31, 2015

(87) PCT Pub. No.: WO2017/095277
PCT Pub. Date: Jun. 8, 2017

(65) Prior Publication Data
US 2017/0265214 A1    Sep. 14, 2017

(51) Int. Cl.
*H04W 72/12* (2009.01)
*H04W 74/08* (2009.01)
(Continued)

(52) U.S. Cl.
CPC ...... *H04W 72/1247* (2013.01); *H04B 7/0456* (2013.01); *H04B 7/0604* (2013.01);
(Continued)

(58) Field of Classification Search
CPC .......... H04W 72/1247; H04W 72/121; H04W 72/14; H04W 72/0453; H04W 72/0446;
(Continued)

(56) References Cited

U.S. PATENT DOCUMENTS

2007/0133457 A1* 6/2007 Doi ................... H04W 74/0816
370/329
2009/0067448 A1* 3/2009 Stanwood ............. H04L 12/413
370/447
(Continued)

FOREIGN PATENT DOCUMENTS

WO    2013009876 A1    1/2013

OTHER PUBLICATIONS

Osseiran, Afif et al., "The foundation of the Mobile and Wireless Communications System for 2020 and beyond", IEEE 77th Vehicular Technology Conference, Jun. 2013, 1-5.
(Continued)

*Primary Examiner* — Vinncelas Louis
(74) *Attorney, Agent, or Firm* — Sage Patent Group

(57) ABSTRACT

A wireless device is configured with a plurality of channel-sensing resources, each channel-sensing resource being associated with at least one corresponding transmission resource. The wireless device evaluates (810), in response to a determination that first data is ready to be transmitted by the wireless device, whether one or more of the plurality of channel-sensing resources are occupied, and transmits (820) at least a part of the first data on at least one transmission resource associated with at least one channel-sensing resource, in response to detecting that the at least one of the plurality of channel-sensing resources is not occupied. The wireless device further receives (830) a grant for a scheduled transmission at least partly overlapping with at least one of
(Continued)

said plurality of channel-sensing resources; and transmits (840) second data in accordance with the received grant.

23 Claims, 18 Drawing Sheets

(51) Int. Cl.
*H04B 7/0456* (2017.01)
*H04B 7/06* (2006.01)
*H04L 5/00* (2006.01)
*H04W 72/00* (2009.01)
*H04W 72/04* (2009.01)
*H04W 72/14* (2009.01)
*H04W 74/04* (2009.01)

(52) U.S. Cl.
CPC ......... *H04L 5/0048* (2013.01); *H04W 72/005* (2013.01); *H04W 72/046* (2013.01); *H04W 72/0446* (2013.01); *H04W 72/0453* (2013.01); *H04W 72/121* (2013.01); *H04W 72/14* (2013.01); *H04W 74/08* (2013.01); *H04W 74/04* (2013.01)

(58) Field of Classification Search
CPC ........... H04W 72/005; H04W 72/1263; H04W 72/1226; H04L 5/0048; H04L 12/413; H04B 7/0456; H04B 7/0604
See application file for complete search history.

(56) References Cited

U.S. PATENT DOCUMENTS

| | | | |
|---|---|---|---|
| 2009/0141701 A1* | 6/2009 | Dalsgaard | H04B 7/2681 370/350 |
| 2012/0281783 A1* | 11/2012 | Cheng | H04B 7/0456 375/295 |
| 2013/0203429 A1* | 8/2013 | Kneckt | H04W 72/1263 455/450 |
| 2016/0105897 A1* | 4/2016 | Liu | H04W 72/1226 370/235 |

OTHER PUBLICATIONS

Eshet, Jacob et al., "Randomly Ranked Mini Slots for Fair and Efficient Medium Access Control in Ad Hoc Networks", IEEE Transactions on Mobile Computing, vol. 6, No. 5, May 2007, 433-445.

* cited by examiner

LISTEN-BEFORE-TALK PERIOD FOR SLOTTED ACCESS WITH SCHEDULED TRAFFIC

TECHNICAL FIELD

The present disclosure is related to wireless communication systems, and is more particularly related to techniques and apparatus in which listen-before-talk techniques are applied to pre-scheduled time-frequency resources.

BACKGROUND

Long Term Evolution (LTE) wireless communication networks developed by members of the 3rd-Generation Partnership Project (3GPP) use orthogonal frequency-division multiplexing (OFDM) in the downlink and Discrete Fourier Transform spread (DFT-spread) OFDM (also referred to as single-carrier frequency-division multiple access, or SC-FDMA) in the uplink. The basic LTE downlink physical resource can thus be seen as a time-frequency grid as illustrated in FIG. 1, where each resource element corresponds to one OFDM subcarrier during one OFDM symbol interval. The uplink subframe has the same subcarrier spacing as the downlink and the same number of SC-FDMA symbols in the time domain as OFDM symbols in the downlink.

In the time domain, LTE downlink transmissions are organized into radio frames of 10 milliseconds (ms), each radio frame consisting of ten equally-sized subframes of length $T_{subframe}=1$ ms, as shown in FIG. 2. For normal cyclic prefix, one subframe consists of 14 OFDM symbols. The duration of each symbol is approximately 71.4 microseconds (μs).

While the development and deployment of LTE networks provides users with greatly increased wireless data rates and has enabled the development of a wide variety of mobile broadband (MBB) services, demand for these services continues to grow. In addition to this increased demand for improved bandwidth and performance, new applications for special-purpose devices, such as machine-to-machine (M2M) devices in machine type communications (MTC), continue to be developed. One of the issues with the existing LTE standard is that it uses a fixed large-sized subframe structure, which results in resource wastage for very small-sized data as is often the case in critical MTC (C-MTC) scenarios.

Accordingly, new radio access technologies are currently under development for a future generation of cellular networks, which may be referred to as "5G" networks. This new development is geared towards fulfilling a wide range of varying requirements including latency, reliability and throughput. 5G is envisioned not only to expand MBB service performance, as in 4G, but also to address a wider range of use cases and enable a fully networked society. These goals are discussed, for example, in Osseiran, A., et al., "The Foundation of the Mobile and Wireless Communications System for 2020 and Beyond: Challenges, Enablers and Technology Solutions," in *Vehicular Technology Conference (VTC Spring), 2013 IEEE 77th*, vol., no., pp. 1-5, 2-5 Jun. 2013.

A subset of 5G design targets includes the support of 1000-times more data traffic, 10 to 100-times higher number of connected devices, 5-times reduced end-to-end latency, and a higher degree of reliability and availability with respect to today's wireless networks. Proposed adaptations include, for example, using different subcarrier spacing as well as smaller and variable sized subframes in mixed mode operation. There is a consensus on the three fundamental enablers to reach 5G targets: more spectrum, denser base station deployment, and better transmission technology.

In standardization efforts by 3GPP, work has been ongoing to study the feasibility of using a pre-scheduled uplink resource to reduce latency. A drawback with allocating pre-scheduled time-frequency resources to wireless devices is that there is no way for the system to know before-hand whether the resources will be utilized or not. This may lead to poor resource utilization and restrict the network in dynamically prioritizing resources. One way to improve the utilization is to pre-assign a given time-frequency resource to multiple users, thereby creating a contention channel between the assigned users. This approach, however, still does not enable user prioritization, nor does it facilitate dynamic scheduling of the time-frequency resource to a different user. Accordingly, improved techniques for efficient utilization of low-latency uplink resources are needed.

SUMMARY

Embodiments of the presently disclosed techniques and apparatus provide mechanisms for prioritizing scheduled access over contention-based access in a slotted system, by adding a listen-before-talk (LBT) period in the beginning of each pre-scheduled transmission-time interval, or "subframe." If a device that is not pre-scheduled for a given frequency resource in this TTI wishes to transmit data but detects the presence of a specific signal or the presence of radio-frequency energy above a threshold in this listen-before-talk period then the TTI is assumed to be occupied and the device defers its transmission. The data transmission for contention-based access is necessarily shorter in time than the duration of the TTI, since contention-based transmitters must initially "listen" for a pre-determined number of symbol times. However, when the same device is pre-scheduled for a frequency resource in the TTI, it may take advantage of the full interval for transmission, in some embodiments.

According to some embodiments, a method is implemented in a wireless device that is configured with a plurality of channel-sensing resources, each channel-sensing resource being associated with at least one corresponding transmission resource. The method comprises evaluating, in response to a determination that first data is ready to be transmitted by the wireless device, whether one or more of the plurality of channel-sensing resources are occupied, and detecting that at least one of the plurality of channel-sensing resources is not occupied. The method further comprises transmitting at least a part of the first data on at least one transmission resource associated with the at least one channel-sensing resource, in response to said detecting. The method still further comprises receiving a grant for a scheduled transmission at least partly overlapping with at least one of said plurality of channel-sensing resources, subsequently to said evaluating, detecting, and transmitting, and transmitting second data in accordance with the received grant.

According to some embodiments, a method in a wireless device includes transmitting a reference signal in one or more frequency resources for an initial period of a pre-scheduled transmission-time interval and transmitting data in a second period of the pre-scheduled transmission-time interval, following the initial period.

According to some embodiments, a method in a wireless device includes receiving, in a first part of a pre-scheduled transmission-time interval, a first signal from a second wireless device. The method also includes transmitting, in a second part of the pre-scheduled transmission-time interval, a clear-to-send indicator, in response to said receiving. The method also includes receiving a second signal from the second wireless device in a third part of the pre-scheduled transmission-time interval, the third part of the pre-scheduled transmission-time interval following the second part of the pre-scheduled transmission-time interval.

According to some embodiments, a method in a wireless device includes detecting a collision in a first part of a pre-scheduled transmission-time interval and transmitting a not-clear-to-send indicator in a second part of the pre-scheduled transmission-time indicator, in response to said detecting, so as to prevent transmissions from one or more other wireless devices in a third part of the pre-scheduled transmission-time interval, the third part of the pre-scheduled transmission-time interval following the second part of the pre-scheduled transmission-time interval.

According to some embodiments, a wireless device includes transceiver circuitry configured to send and receive transmissions, and processing circuitry configured to control the transceiver circuitry. The processing circuitry is configured with a plurality of channel-sensing resources, each channel-sensing resource being associated with one or more corresponding transmission resources, and is further configured to evaluate, in response to a determination that first data is ready to be transmitted by the wireless device, whether one or more of the plurality of channel-sensing resources are occupied, and to detect that at least one of the plurality of channel-sensing resources is not occupied. The processing circuitry is further configured transmit at least a part of the first data on at least one transmission resource associated with the at least one channel-sensing resource, in response to said detecting. The processing circuitry is still further configured to receive a grant for a scheduled transmission at least partly overlapping with at least one of the plurality of channel-sensing resources, subsequently to said evaluating, detecting, and transmitting, and to transmit second data in accordance with the received grant According to some embodiments, a wireless device includes transceiver circuitry configured to send and receive transmissions and processing circuitry. The processing circuitry is configured via the transceiver circuitry to transmit a reference signal in one or more frequency resources for an initial period of a pre-scheduled transmission-time interval. The processing circuitry is configured to transmit data in a second period of the pre-scheduled transmission-time interval, following the initial period.

According to some embodiments, a wireless device includes transceiver circuitry configured to send and receive transmissions and processing circuitry. The processing circuitry is configured via the transceiver circuitry to receive, in a first part of a pre-scheduled transmission-time interval, a first signal from a second wireless device and transmit, in a second part of the pre-scheduled transmission-time interval, a clear-to-send indicator, in response to said receiving. The processing circuitry is configured to receive a second signal from the second wireless device in a third part of the pre-scheduled transmission-time interval, the third part of the pre-scheduled transmission-time interval following the second part of the pre-scheduled transmission-time interval.

According to some embodiments, a wireless device includes transceiver circuitry configured to send and receive transmissions and processing circuitry. The processing circuitry is configured via the transceiver circuitry to detect a collision in a first part of a pre-scheduled transmission-time interval and transmit a not-clear-to-send indicator in a second part of the pre-scheduled transmission-time indicator, in response to said detecting, so as to prevent transmissions from one or more other wireless devices in a third part of the pre-scheduled transmission-time interval, the third part of the pre-scheduled transmission-time interval following the second part of the pre-scheduled transmission-time interval.

Other embodiments include computer program products and/or computer-readable media comprising program instructions that, when executed by processing circuitry, carry out the above methods.

With the techniques disclosed herein, it is possible to achieve low latency uplink transmissions using contention-based access, without setting aside resources that cannot be used for scheduled access. These techniques thus combine the benefits of scheduled access, e.g., access with no collisions, and contention-based access, e.g., low delays. Furthermore, some embodiments of these techniques enable prioritization among different kinds on data transmissions on a contention-based channel.

Of course, the present invention is not limited to the above features and advantages. Indeed, those skilled in the art will recognize additional features and advantages upon reading the following detailed description, and upon viewing the accompanying drawings.

DETAILED DESCRIPTION

As discussed above, the feasibility of using a pre-scheduled uplink resource to reduce latency has been discussed. However, a drawback with allocating pre-scheduled time-frequency resources to wireless devices is that there is no way for the system to know before-hand whether the resources will be utilized or not, which may lead to poor resource utilization and restrict the network in dynamically prioritizing resources.

Embodiments of the presently disclosed techniques and apparatus effectively combine the use of pre-scheduled time-frequency resources with the use of contention-based techniques in those same resources. These techniques and apparatus more specifically provide mechanisms for prioritizing scheduled access over contention-based access in a slotted system, by adding a listen-before-talk period in the beginning of each pre-scheduled transmission-time interval, or "subframe." If a device that is not pre-scheduled for a given frequency resource in this TTI wishes to transmit data but detects the presence of a specific signal or the presence of radio-frequency energy above a threshold in this listen-before-talk period then the TTI is assumed to be occupied and the device defers its transmission.

The data transmission for contention-based access is necessarily shorter in time than the duration of the TTI, since contention-based transmitters must initially "listen" for a pre-determined number of symbol times. However, if the device is pre-scheduled for a given frequency resource in the TTI, it may take advantage of the full interval for transmission, in some embodiments.

Prioritization between scheduled data and contention-based data access is provided by allowed scheduled devices to begin transmitting earlier in a given TTI than devices that are seeking contention-based access to the pre-scheduled resources. This allows the devices seeking contention-based access to detect a scheduled data transmission, using carrier-sense techniques. Furthermore, additional prioritization among different contention-based accesses is also possible, by assigning different lengths for the carrier sense period, starting from the beginning of the subframe, to different devices and/or to different service types.

Channel Sensing in a Scheduled Transmission-Time Interval

Figure 1:
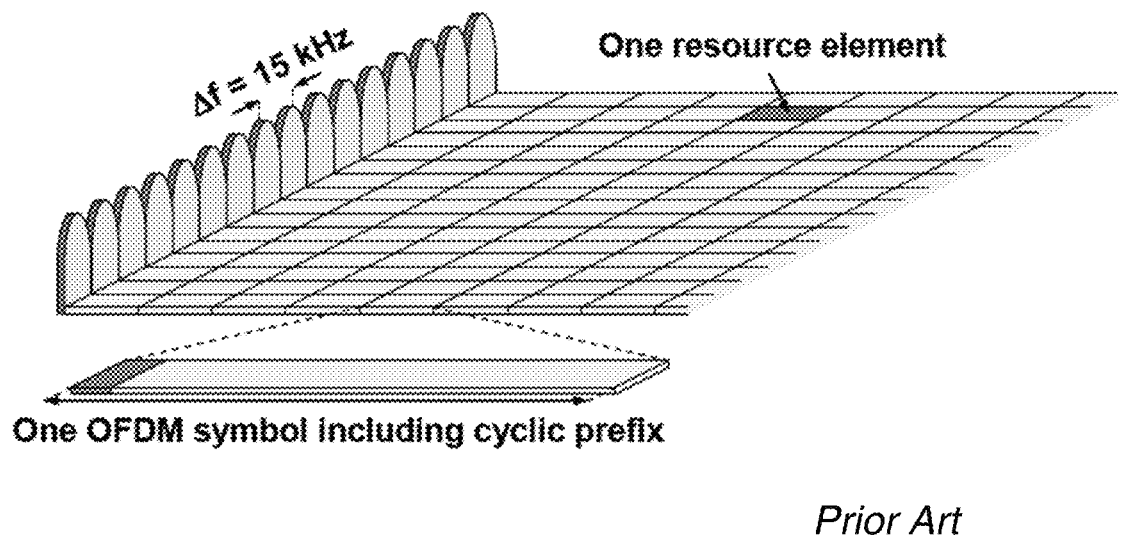
FIG. 1 illustrates a diagram illustrating an LTE downlink physical resource.
Figure 2:
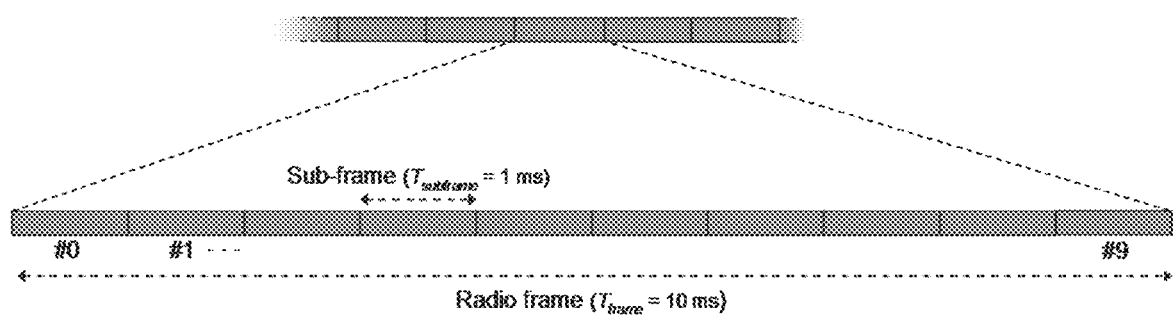
FIG. 2 illustrates a diagram of an LTE time-domain structure.
Figure 3:
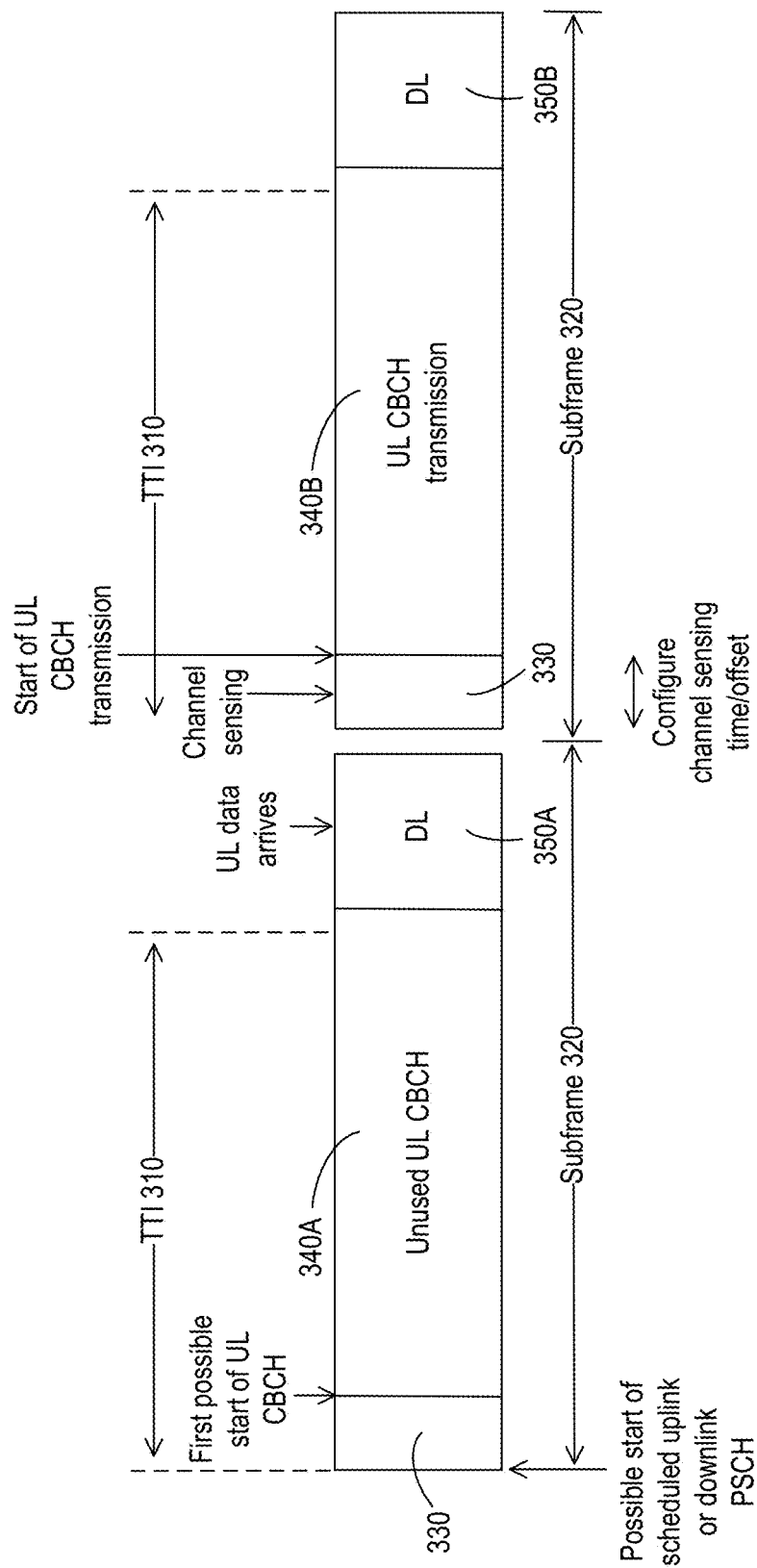
FIG. 3 illustrates a diagram of techniques for uplink transmissions, according to some embodiments.

FIG. 3 illustrates an example application of these techniques to uplink transmissions, i.e., transmissions from a radio access device, which may be variously referred to as a mobile terminal, user equipment (UE), user device, or wireless device, to an access node, which may be variously referred to as an access point, base station, radio base station, Node B, eNodeB, etc. It should be understood, however, that the present techniques are not limited to such uplink transmissions, but could be applied in ad-hoc networks and/or peer-to-peer scenarios, for example.

FIG. 3 more particularly illustrates the usage of a given frequency resource, which may be regarded as a "channel" or "subchannel," across two TTIs 310 and two corresponding "subframes" 320. In the illustrated example, each TTI 310 occupies less than the entire corresponding subframe 320, with a small reserved portion 350 of each subframe being reserved for a possible downlink transmission. In other embodiments, however, downlink transmissions may be limited to other time-frequency resources, such that each TTI 310 occupies an entire subframe 320.

Each TTI 310 begins with a channel-sensing period 330, followed by a transmission window that may be referred to as an uplink contention-based channel (UL CBCH) interval 340, during which interval an uplink transmission for a contention-based access may or may not occur. In the illustrated scenario, no transmission occurs during UL CBCH interval 340A, while a transmission does occur during UL CBCH interval 340B. Note that a wireless device may have been previously allocated, or "pre-scheduled" with, the illustrated time-frequency resources, for as-needed use. This pre-scheduled device has priority access to these time-frequency resources, and asserts this priority, when needed, by beginning its uplink transmission at the beginning of the TTI 310. Similarly, a base station may begin a downlink transmission at the beginning of any given TTI 310.

A wireless device seeking contention-based access to the frequency resource "listens" for a priority user during a channel-sensing period 330. If this listening indicates that contention-based access is available, the wireless device begins its uplink transmission at the beginning of the corresponding UL CBCH interval 340. In the illustrated scenario, a wireless device detects a need for uplink transmission near the end of the first subframe 320, more specifically during the reserved portion 350A. The wireless device then listens for a priority transmission during the subsequent channel-sensing period 330 and, having sensed no priority transmissions, begins its uplink transmission at the beginning of UL CBCH interval 340B. In the illustrated example scenario, this uplink transmission is acknowledged by a short downlink transmission in the reserved portion 350B, immediately following the contention-based uplink transmission.

Determining the Channel-Sensing Period

In some embodiments of the presently disclosed techniques, the channel-sensing period 330, which may be alternatively referred to as a "carrier-sense period," is a fixed time and/or frequency window, e.g., as defined in an industry standard. This fixed period may have a duration of one or several symbol times. In other embodiments, the network may configure the duration or an offset, or both, of the carrier-sense period, notifying the wireless device of the configuration via broadcasted system information or radio resource control (RRC) signaling. The configured period, in some embodiments, may depend on a priority assigned to the wireless device, and/or to a priority assigned to a particular service. Thus, in some embodiments any of several different periods may be applied, depending on what data triggers the contention-based transmission. It will be appreciated that assigning shorter and/or earlier channel-sensing periods to a given device or service will give that device or service a higher priority of access to the contention-based channel, since those devices assigned a longer or later channel-sensing period will experience a higher likelihood of being preempted by an earlier-acting contention-based access.

In some embodiments, timing advance parameters are also considered by the wireless device when computing the required carrier-sense period. A wireless device with a large timing advance may have a longer carrier-sense period, in some of these embodiments, so that each member of a set of devices sharing the same contention based-channel has the same or similar transmission start times.

In some embodiments, the subframe number and/or result from earlier carrier sense attempts may also be considered when determining the carrier-sense period for a given TTI.

This way, improved fairness can be provided among users sharing a contention-based channel, while still limiting the collision probability.

Transmission Format

In some embodiments, a distinct transmission format is used by wireless devices (including base stations, in some embodiments) in subframes where contention-based access is configured. For example, a pre-scheduled wireless device or a wireless device beginning a contention-based access may include a reference signal at the beginning of the transmission, where the reference signal is configured by or derived based on the wireless device.

The transmission format configuration may be the same for both scheduled transmissions and contention-based transmissions, in some embodiments. Alternatively, different reference signals can be used, dependent on access type and/or start-symbol. This way, carrier-sensing by a device seeking contention-based access can be done by correlating a signal received during the channel-sensing period with a known reference signal, or which each of a set of possible reference signals, instead of by only measuring radio-frequency energy during the channel-sensing period. This correlation-based approach can provide better coverage for carrier sensing, thus reducing the blocking of transmissions due to collisions with traffic to other nodes. A correlation-based approach can also be used to disregard co-existing transmissions that are intentionally multiplexed by the serving node, in some embodiments, e.g. using MU-MIMO.

In some embodiments, different antenna settings are used for transmitting the reference signal, compared to transmitting the data. For example, a broadcast or diversity setting may be used for the reference signal, while a beam-formed transmission is used for data, targeting a specific receiving node.

In some embodiments a wireless device is configured with one or more reference signals that are assigned to other users that the base station knows are possible to spatially multiplex. In these embodiments, a wireless device configured with these one or more reference signals may remove energy corresponding to these reference signals from the signal received during the contention window. The wireless device may then simply compare the remaining residual energy to a threshold to evaluate whether the wireless device can begin a contention-based access, in some embodiments, where a level above the threshold indicates that the channel is already occupied by a transmission that cannot coexist with a transmission by the wireless device.

In some embodiments, a wireless device is configured with a set of reference signals assigned to other users that the base station knows are not possible to multiplex and/or for which the wireless device may have a bad link budget. During the contention window the wireless receiver correlates the received signal with these reference signals and utilizes the processing gain provided by the reference signal to detect these signals. If one of these reference signals is detected, despite the overall energy in the channel-sensing window being below the above-mentioned threshold, the wireless device can assume that the channel is already occupied by a "hidden" transmitter, and thus defer its contention-based access.

In some embodiments, the removal of energy corresponding to transmissions that can safely coexist with a transmission by the wireless device may be combined with a carrier-sensing process that looks for one or more other reference signals that positively indicate an occupied channel Thus, the wireless device may remove, from the signal received during the carrier-sensing window, energy corresponding to "good" reference signals, i.e., reference signals for transmissions that can safely coexist with a transmission from the wireless device. After this energy is removed, the wireless device can then correlate the remaining residual signal with one or more "bad" reference signals, i.e., reference signals indicating the presence of a transmission that cannot safely coexist with a transmission from the wireless device. Upon detecting one or more of these "bad" reference signals, and/or upon the total residual energy exceeding a predetermined threshold, the wireless device defers its contention-based access to a later TTI.

In some embodiments, different reference signals are used depending on whether the transmission comes from a serving node or from a device served by the serving node. This way it is possible to determine whether the subframe is used for uplink or downlink, which may in turn affect the detection threshold for the carrier-sensing. In other embodiments, the same detection threshold is used, without regards to whether the detected transmission is an uplink or downlink transmission.

Figure 4:
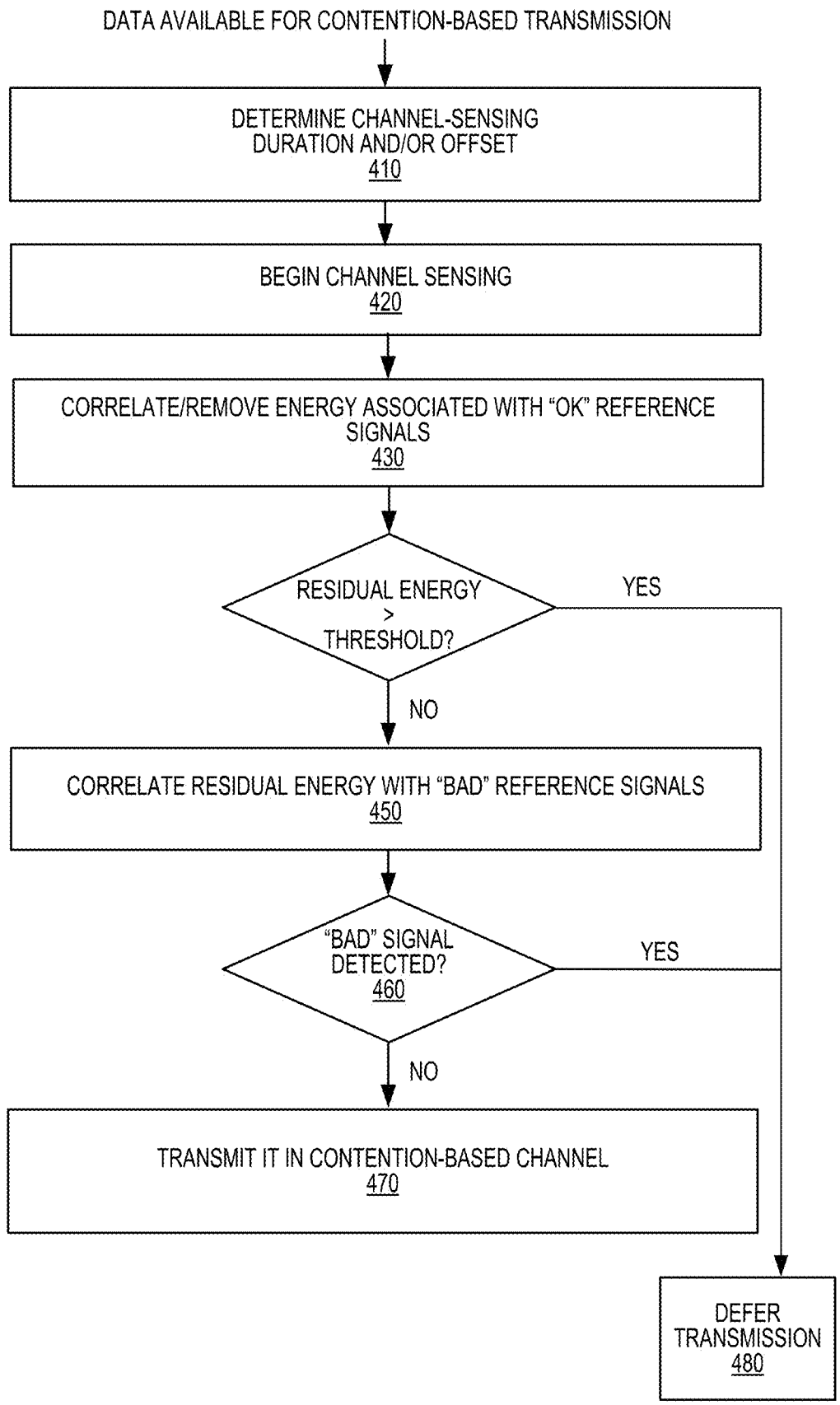
FIG. 4 is a process flow diagram illustrating a method carried out by a wireless device, according to some embodiments.

FIG. 4 is a process flow diagram illustrating an example method, carried out by a wireless device, in which several of the techniques described above are used. The process is triggered by the availability of data for contention-based transmission. As shown at block 410, the illustrated method begins with the determining of a duration and/or offset for the channel-sensing period. As discussed above, the duration and/or offset may depend on a priority of the wireless device, or a priority of the data to be transmitted, or both, and may further or instead depend on a subframe number of other identifier for the time-frequency resource to be used, and/or timing-advance parameters for the wireless device.

As shown at block 420, the wireless device next begins channel sensing, at the beginning of the next TTI. As discussed above, this channel sensing, which may be generally understood as an analysis of radio-frequency energy received in one or more frequency resources during an initial period of a pre-scheduled TTI, may include, in various embodiments, any of several possible combinations of energy measurement, reference signal detection, and the removal (i.e., cancellation) of certain reference signals. In the illustrated method, the channel sensing includes all three techniques.

Thus, as shown at block 430, the wireless device correlates the received signal during the channel-sensing interval with one or more predetermined reference signals, referred to in the figure as "OK" reference signals. To the extent that any of these reference signals are detected, energy corresponding to those reference signals is then removed from the received signal, to create a residual signal for further evaluation. These "OK" reference signals may correspond to transmitted signals that may safely coexist with a transmission from the wireless device, e.g., because they can be spatially separated by the receiving node. This removal of the reference signal is similar to well-known interference cancellation approaches, and may employ similar techniques for scaling, aligning, and subtracting a "cancellation" signal from the received signal.

As shown at block 440, the energy in the residual signal is then compared to a predetermined threshold. If the energy exceeds the threshold, then the wireless device assumes that the contention-based channel/resource is already occupied, and defers transmission, as shown at block 480. Otherwise, the process continues with still further evaluation of the residual signal. Accordingly, as shown at block 450, the residual signal is correlated with one or more other predetermined reference signals, referred to in the figure as "bad"

reference signals. These reference signals correspond to transmissions that cannot coexist with a transmission from the wireless device. Thus, if any of these "bad" reference signals is detected, as shown at block 460, the transmission by the wireless device is deferred (block 480). Otherwise, as shown at block 470, the wireless device is free to transmit in the contention-based channel/frequency resource.

As noted, the process illustrated in FIG. 4 includes a complex analysis of the received signal, including the detection and removal of "OK" reference signals, an evaluation of the energy in the residual signal, and a search for "bad" reference signals in the residual signal. It will be appreciated that some embodiments may omit one or two of these analysis steps.

User Grouping

As suggested above, the users served by one base station in a radio network are not necessarily within radio-coverage of each other, which means that carrier sensing may only detect a subset of potential users. To avoid or reduce collisions, a network node, e.g., a base station, can set up multiple contention-based channels, using different allocations of time, frequency, and/or reference signals. A given wireless device can then be allocated one or several of these channels, in such a manner that all, or a large fraction, of the users sharing any given contention-based channel can detect each one another's transmissions using the channel-sensing techniques described above.

In the event that a wireless device wants to grab more than one frequency-separated contention-based channel, then it may be possible to ignore the carrier-sensing measurements on some channels, in some embodiments or instances. For example, in the event that the serving base station has allocated one contention-based channel to a group of wireless devices that can be spatially separated by the base station, then the interference detected on that channel may be ignored by a wireless device when deciding whether it can grab a particular set of contention-based channels. In some embodiments, the wireless device may be assigned a weighting vector (for example a bit-map with zeros and ones) that it can use in case it wants to decide whether or not it is possible to grab more than one contention based resource or not.

In some embodiments, the carrier-sense period is derived on a per-channel basis or on a per-channel-group basis, to align the transmissions of all users on the given channel or group of channels. A device with two channel allocations can thus have two different carrier-sense periods, one for each channel or group of channels. This can be configured by the network, in some embodiments, or blindly detected by the wireless devices by monitoring the reception timing of reference signals, in others.

In some embodiments, power-control parameters are set on a per-channel basis, based on the users sharing the channel A user close to the serving node may use a rather high power, compared to what might be necessary to be heard by the serving node, so as to be heard by users further from the serving node and sharing the same contention-based channel. In some embodiments, this relatively high power may be used only for a subset of the time and/or frequency of the contention-based transmission, or only for some reference signals.

In order to form groups, it is useful for the network to know the radio propagation conditions between devices. In some embodiments, the devices are thus instructed to measure on a set of reference signals and report the detection and or signal strength of said reference signals. These measurements are then used by the network to form groups sharing the same contention-based channel. In some embodiments, the devices are instructed to transmit reference signals, to enable measurements of the reference signals by other devices.

Clear-to-Send Indications

In some embodiments of the techniques described herein, a contention-based transmission is divided into two parts, transmitted in two distinct sub-intervals of time, where an indication of whether the second part should be transmitted is derived from a received signal observed in the time between the two sub-intervals. The time between the two transmission-time sub-intervals is referred to as the interruption time.

Figure 5:
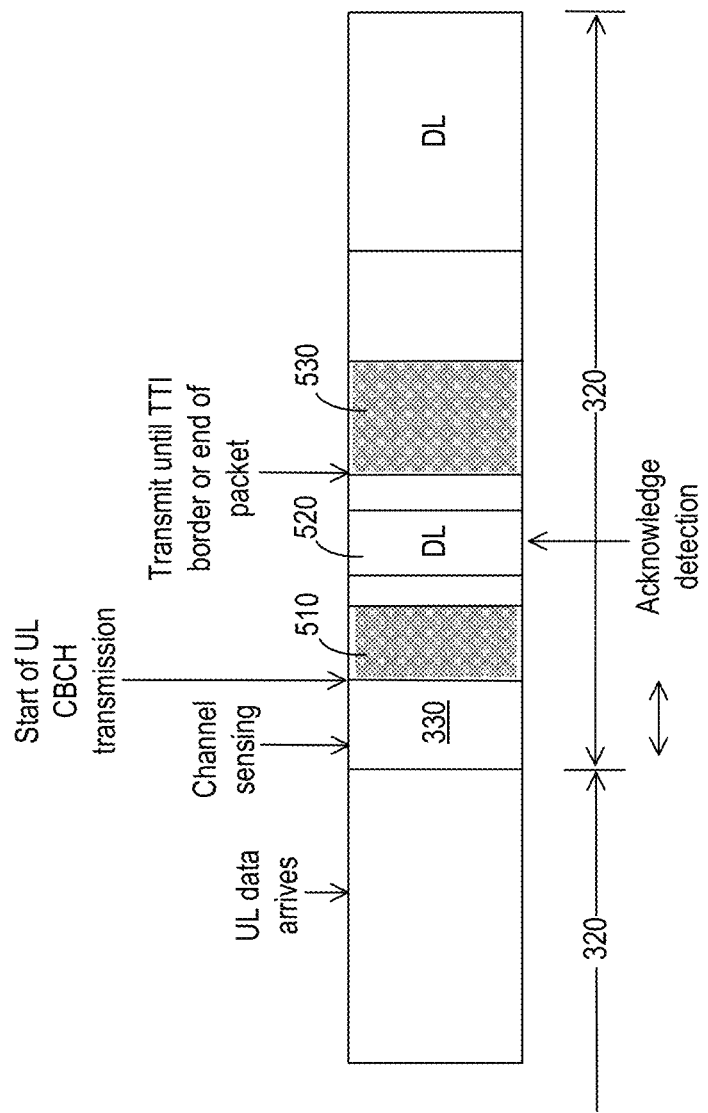
FIG. 5 illustrates an example scenario according to some embodiments.

FIG. 5 illustrates an example scenario according to this approach. As seen in the figure, uplink data for transmission "arrives" in the wireless device at a first time instant, in that it is queued for transmission. Channel sensing thus begins at the beginning of the next subframe 320; at the end of the channel-sensing period 330, a first part 510 of an uplink contention-based channel transmission is sent. This first part 510 has a predetermined duration, at the end of which the wireless device stops transmitting and evaluates the signal received during a short interruption interval 520, to determine whether the second part of the uplink transmission should be sent. If a clear-to-send indication is detected during the interruption interval, then a second part 530 of the contention-based uplink transmission is sent.

In some embodiments, the use of this interruption/"clear to send" indication is configured by the network, and thus can be turned on and off, depending on network conditions such as the current load on the contention-based channel in the serving node. In other embodiments, the use of this approach is fixed by the standard. Whether or not the use of the interruption interval and clear-to-send indication is fixed or network-configurable, its usage may also vary from one subframe to another, e.g., based on the subframe number, according to a rule defined by standard or configured by network signaling.

In some embodiments, the duration of the first transmission sub-interval 510 and/or the duration of the interruption interval 520 between the two transmission sub-intervals is configured by the network node. In some embodiments, either or both is derived by the device, based on, for example, priority of data or timing advance configurations.

In some embodiments, the device will look for a specific signal or message in the time between the two time intervals, where the specific signal or message is sent from the serving node. In other embodiments signaling during the interruption interval may also be sent by other nodes or devices. Thus, for example, in some embodiments, wireless devices send a message during the interruption period of other devices if a collision is detected. In some embodiments, the second part of the transmission is transmitted only if a specific signal is detected; in other embodiments, the second part is transmitted only if a specific signal is not detected during the interruption-period. In the latter case, this specific signal may thus be considered a "not-clear-to-send" indication. In some embodiments, rather than seeking a particular signal, the wireless measures received energy in the interruption period 520 and sends the second part 530 of the transmission only if the received energy is below a threshold.

Figure 6:
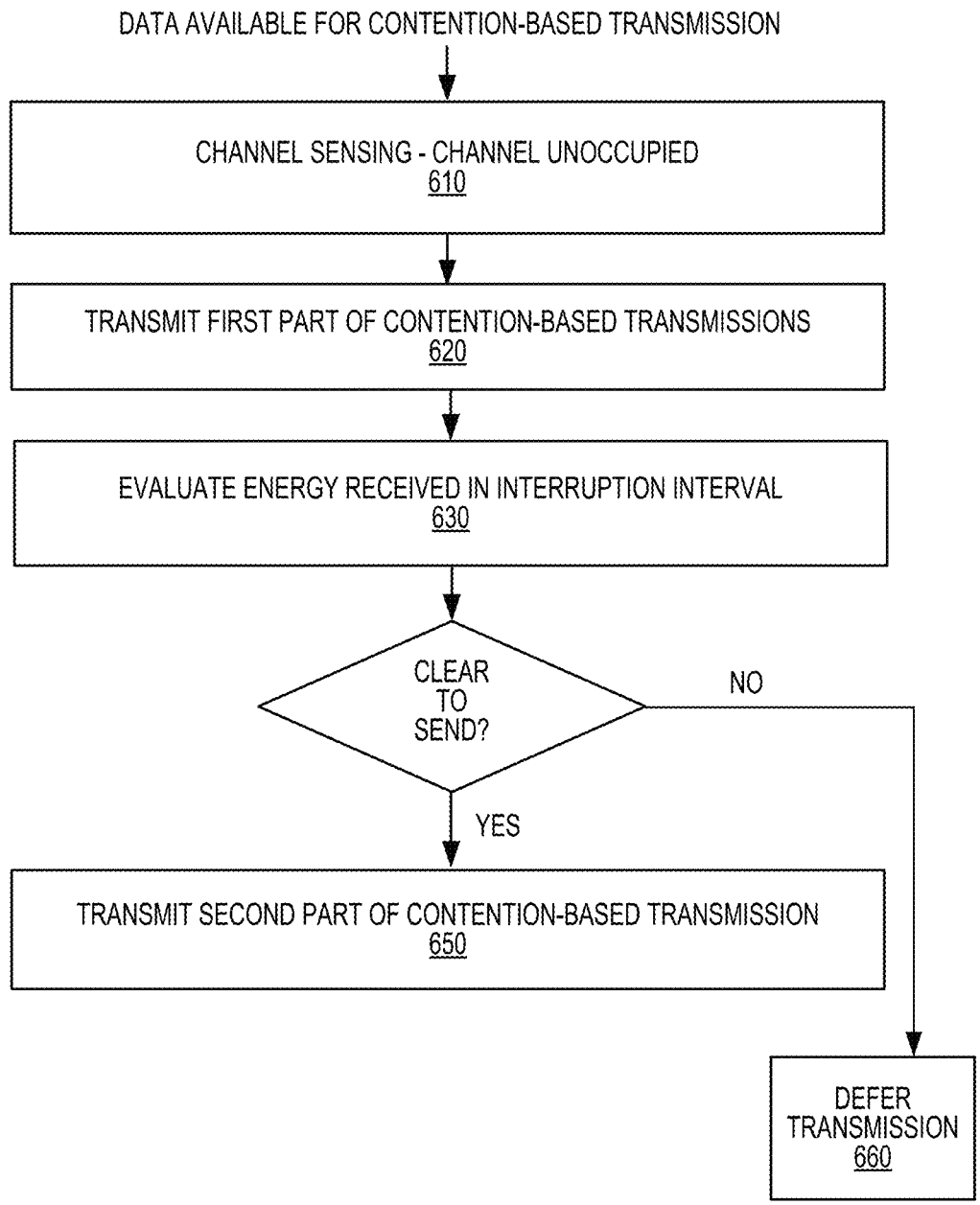
FIG. 6 is a process flow diagram illustrating an example method, implemented by a wireless device, in which a "clear-to-send" technique is used, according to some embodiments.

FIG. 6 is a process flow diagram illustrating an example method, implemented by a wireless device, in which a "clear-to-send" technique is used. Once again, the method is triggered by the availability of data for contention-based transmission. As shown at block 610, channel sensing is performed—in the illustrated scenario, the channel is determined to be unoccupied. Note that the channel sensing of block 610 may be performed according to the method illustrated in FIG. 4, in some embodiments, or according to some variation of that method.

As shown at block 620, a first part of a contention-based transmission is sent, in response to the determination that the contention-based channel is unoccupied. This first part has a predetermined duration, after which an "interruption" interval begins. Energy received during this interruption interval is evaluated, as shown at block 630—this evaluation may be according to any of the techniques discussed above for determining whether a clear-to-send signal or a not-clear-to-send indication is detected. If it is determined that the channel is clear to send, as shown at block 640, then a second part of the contention-based transmission is sent, as shown at block 650. Otherwise, transmission is deferred, as shown at block 660.

Generalization of "Channel-Sensing Periods" and "Transmission Windows"

The preceding discussion explained that each of one or more frequency channels, or frequency resources, may include channel-sensing periods or channel-sensing intervals, each channel-sensing period or interval being followed by a transmission window. It was further explained that these periods may be different, on different channels/frequency resources. It should thus be appreciated that a channel-sensing period on a given channel or frequency resource can be understood as a "channel-sensing resource," where a channel-sensing resource is a time-frequency resource, i.e., a particular interval of time on a particular frequency resource. Similar, each of the transmission windows discussed above may be understood as a "transmission resource", where a transmission resource is a time-frequency, i.e., a particular interval of time on a particular frequency resource. In the following discussion, the terms "channel-sensing resource" and "transmission resource" are used to describe various embodiments of the presently disclosed techniques and apparatus—it should be understood that these terms should be interpreted in a manner that is fully consistent with the various detailed examples discussed above.

Figure 7:
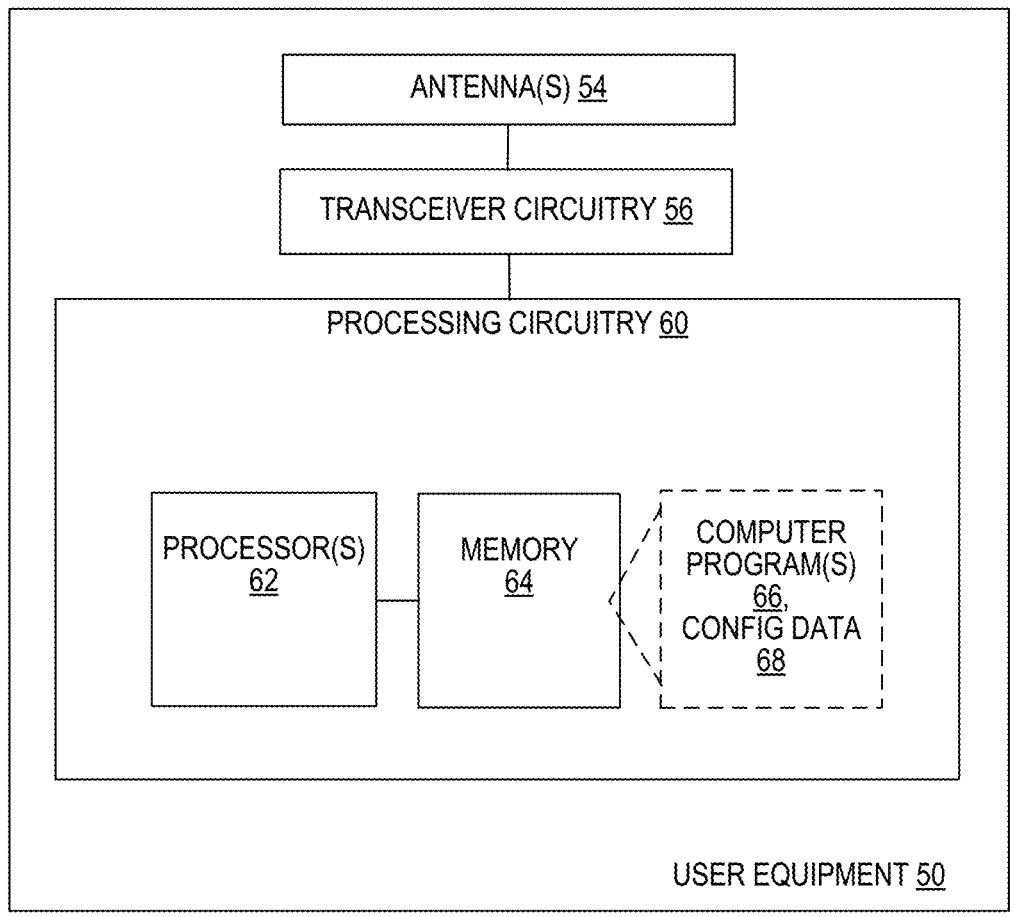
FIG. 7 is a block diagram of a wireless device, according to some embodiments.

FIG. 7 illustrates a diagram of a wireless device, such as UE 50, configured to implement the techniques described herein according to some embodiments. To ease explanation, the user equipment 50 may also be considered to represent any wireless devices that may operate in a network. The UE 50 herein can be any type of wireless device capable of communicating with network node or another UE over radio signals. The UE 50 may also be radio communication device, target device, device to device, D2D, UE, machine type UE or UE capable of machine to machine communication, M2M, a sensor equipped with UE, PDA (personal digital assistant), Tablet, mobile terminals, smart phone, laptop embedded equipped, LEE, laptop mounted equipment, LME, USB dongles, Customer Premises Equipment, CPE, etc.

The UE 50 communicates with a radio access network node or base station, such as the network node 30, via antennas 54 and transceiver circuitry 56. The transceiver circuitry 56 may include transmitter circuits, receiver circuits, and associated control circuits that are collectively configured to transmit and receive signals according to a radio access technology, for the purposes of providing cellular communication services.

The UE 50 also includes processing circuitry 60 that is operatively associated with the radio transceiver circuitry 56. The processing circuitry 60 comprises one or more digital processing circuits 62, e.g., one or more microprocessors, microcontrollers, Digital Signal Processors or DSPs, Field Programmable Gate Arrays or FPGAs, Complex Programmable Logic Devices or CPLDs, Application Specific Integrated Circuits or ASICs, or any mix thereof. More generally, the processing circuitry 60 may comprise fixed circuitry, or programmable circuitry that is specially adapted via the execution of program instructions implementing the functionality taught herein, or may comprise some mix of fixed and programmed circuitry. The processing circuitry 60 may be multi-core.

The processing circuitry 60 also includes a memory 64. The memory 64, in some embodiments, stores one or more computer programs 66 and, optionally, configuration data 68. The memory 64 provides non-transitory storage for the computer program 66 and it may comprise one or more types of computer-readable media, such as disk storage, solid-state memory storage, or any mix thereof. By way of non-limiting example, the memory 64 comprises any one or more of SRAM, DRAM, EEPROM, and FLASH memory, which may be in the processing circuitry 60 and/or separate from processing circuitry 60. In general, the memory 64 comprises one or more types of computer-readable storage media providing non-transitory storage of the computer program 66 and any configuration data 68 used by the user equipment 50.

The UE 50 is configured to selectively transmit based on an analysis of radio-frequency energy. This may include a UE that has to perform a Listen-Before-Talk (LBT) procedure. For example, the processing circuitry 60 may execute a computer program 66 stored in the memory 64 that configures the processing circuitry 60 to use transceiver circuitry 56 to analyze radio-frequency energy received in one or more frequency resources during an initial period of a pre-scheduled transmission-time interval and selectively transmit or refrain from transmitting in said one or more frequency resources during a second period of the pre-scheduled transmission-time interval, based on said analyzing. The processing circuitry 60 may be further configured to transmit in scheduled time-frequency resources, in response to receiving a grant for a scheduled transmission.

Accordingly, in some embodiments the processing circuitry 60 is configured with a plurality of channel-sensing resources, each channel-sensing resource being associated with one or more corresponding transmission resources. The processing circuitry 60 in these embodiments is configured to evaluate, in response to a determination that first data is ready to be transmitted by the wireless device, whether one or more of the plurality of channel-sensing resources are occupied, and to detect, for example, that at least one of the plurality of channel-sensing resources is not occupied. In this case, the processing circuitry 60 would then transmit at least a part of the first data on at least one transmission resource associated with the at least one channel-sensing resource, in response to said detecting. The processing circuitry 60 is still further configured to receive a grant for a scheduled transmission partly overlapping with at least one of the plurality of channel-sensing resources, and to transmit second data in accordance with the received grant.

Figure 8A:
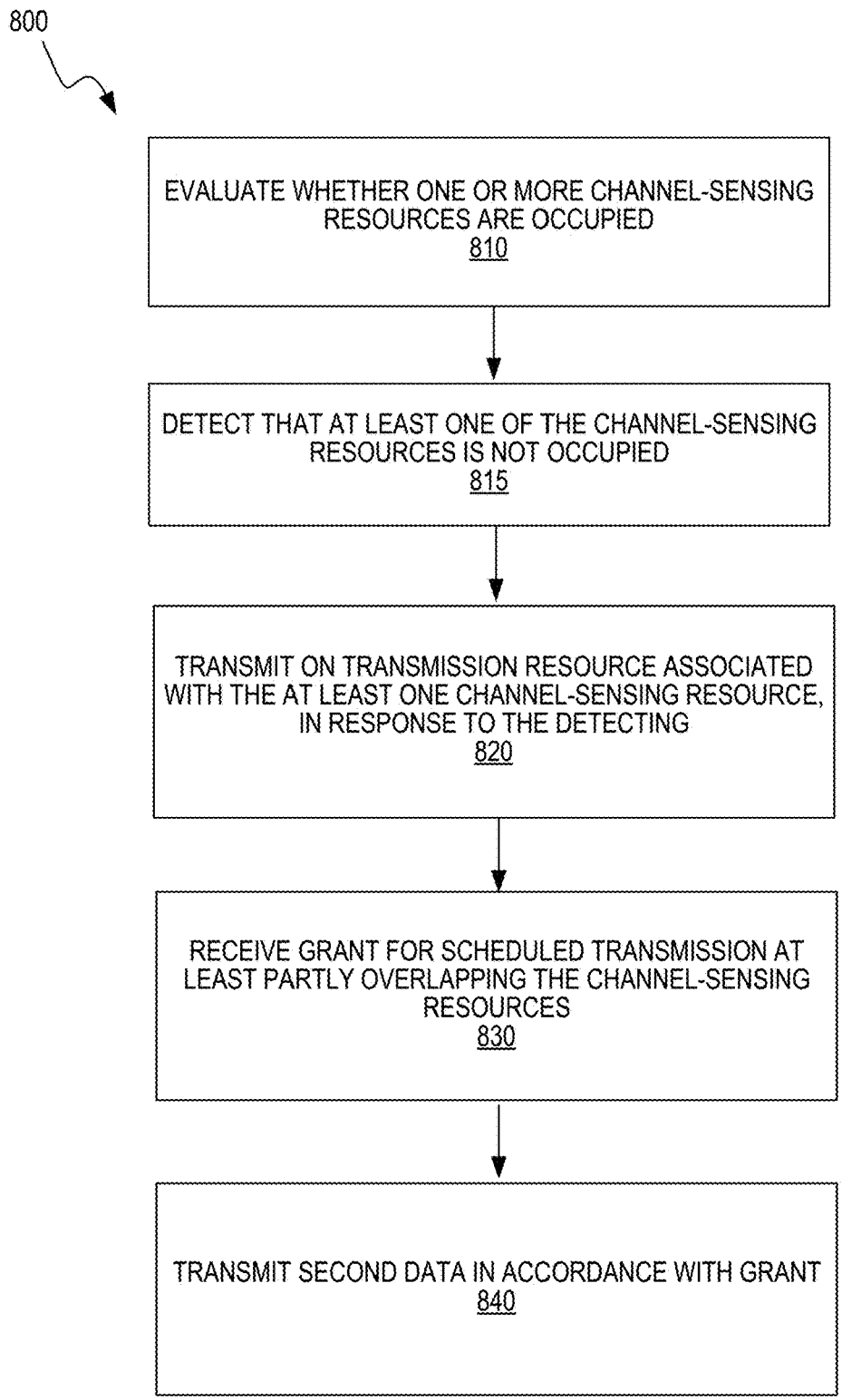
FIG. 8A is a flowchart showing a method in a wireless device, according to some embodiments.

The processing circuitry 60 of the UE 50 may thus be understood as being configured to perform one or more methods in accordance with the currently disclosed techniques, such as method 800 of FIG. 8A. The method 800 is implemented in a wireless device that is configured with a plurality of channel-sensing resources, each channel-sensing resource being associated with at least one corresponding transmission resource. Method 800 includes evaluating, in response to a determination that first data is ready to be transmitted by the wireless device, whether one or more of the plurality of channel-sensing resources are occupied (Block 810). The method further comprises detecting that at least one of the plurality of channel-sensing resources is not occupied (Block 815). The method further comprises transmitting at least a part of the first data on at least one transmission resource associated with the at least one channel-sensing resource, in response to said detecting (Block 820). Method 800 still further includes receiving a grant for a scheduled transmission at least partly overlapping with at least one of said plurality of channel-sensing resources (Block 830), subsequently to said evaluating, detecting, and transmitting, and then transmitting second data in accordance with the received grant (Block 840). The second data may be a different type of data from the first data, in some embodiments, such as data from a different application or service. However, the second data need not necessarily be a different type from the first data—in some embodiments, the second data may even be a retransmission of the first data, in which case it could be identical to the first data.

In some embodiments, evaluating whether one or more of the plurality of channel-sensing resources are occupied comprises analyzing radio-frequency energy received in the one or more of the plurality of channel-sensing resources, in which embodiments the detecting that at least one of the plurality of channel-sensing resources is not occupied is based on this analysis.

In some of these embodiments, analyzing radio-frequency energy received in the one or more of the plurality of channel-sensing resources includes comparing radio-frequency energy received in each channel-sensing resource to a predetermined threshold and detecting that at least one of plurality of channel-sensing resources is not occupied by determining that radio-frequency energy received in the at least one of the one or more of the frequency resources is less than the predetermined threshold. In a further embodiment, the analyzing includes correlating a signal received in a first channel-sensing resource against a first predetermined reference signal and the method 800 further includes omitting received radio-frequency energy corresponding to the first predetermined reference signal when comparing received radio-frequency energy for the first channel-sensing resource to the predetermined threshold.

In other embodiments, the analyzing includes correlating a signal received in the first channel-sensing resource against each of one or more predetermined reference signals and removing signal energy corresponding to one or more of the predetermined reference signals from the signal received in the first channel-sensing resource, based on the correlating, to obtain a residual signal. The energy in the residual signal is then compared to the predetermined threshold. The detecting that at least one of the plurality of channel-sensing resources is not occupied is based on the comparing of the energy in the residual signal to the predetermined threshold.

In some embodiments, analyzing the radio-frequency energy received in the one or more of the plurality of channel-sensing resources comprises correlating a signal received in a channel-sensing resource against a second predetermined reference signal, where the detecting that at least one of the plurality of channel-sensing resources is not occupied may then be in response to detecting the presence of the second predetermined reference signal, based on said correlating.

In some embodiments, prior to the evaluating discussed above, a duration of the channel-sensing resources is determined based at least in part on received configuration information. Determining the duration of the channel-sensing resources may be based at least in part on a result from a previous attempt to determine whether one or more other wireless devices were transmitting during an earlier transmission-time interval. Determining the duration of the channel-sensing resources may be based at least in part on a type of data to be transmitted by the wireless device. Determining the duration of the channel-sensing resources may also be based at least in part on a timing advance parameter for the wireless device.

In some embodiments, the evaluating shown in block 810 comprises analyzing radio-frequency energy received in a the first one of the one or more channel-sensing resources during a first analysis period, having a first duration, and the method further comprises analyzing, in the pre-scheduled transmission-time interval, radio-frequency energy received in a second one of the one or more channel-sensing resources during a second analysis period having a second duration. In these embodiments, the method may further comprise transmitting a part of the first data on a second transmission resource, corresponding to second one of the one or more channel-sensing resources, in response to determining, based on the analyzing of the radio-frequency energy received in the second one of the one or more frequency resources, that the second one of the one or more channel-sensing resources is not occupied. Thus it can be seen that determining whether or not to transmit in contention-based resources may be performed independently, for different resources, in some embodiments. Note that the first and second durations may differ.

Figure 8B:
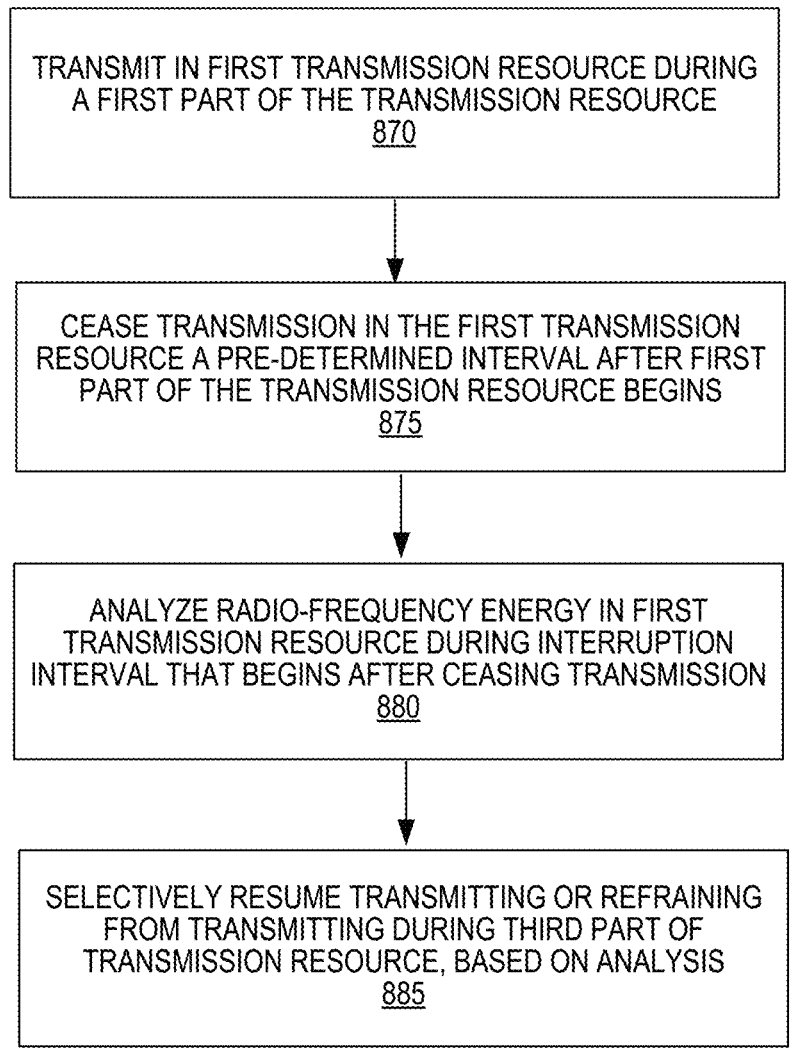
FIG. 8B is a flowchart showing a related method in a wireless device, according to some embodiments.

FIG. 8B shows a related method, which is a variation on the technique shown in FIG. 8A and which may be carried out in the same wireless device discussed above. In the illustrated method, the transmitting step that was shown at block 820 in FIG. 8A comprises transmitting in a first transmission resource during a first part of the first transmission resource, as shown at block 870. The method further includes ceasing transmission in the first transmission resource a pre-determined interval after the first part of the first transmission resource begins (Block 875), analyzing radio-frequency energy received in the first transmission resource during an interruption interval that begins after said ceasing (Block 880), and selectively resuming transmission or refraining from transmitting (Block 885) in the first transmission resource during a third part of the transmission resource, based on the analyzing of radio-frequency received in the first transmission resource during the interruption interval.

Figure 9:
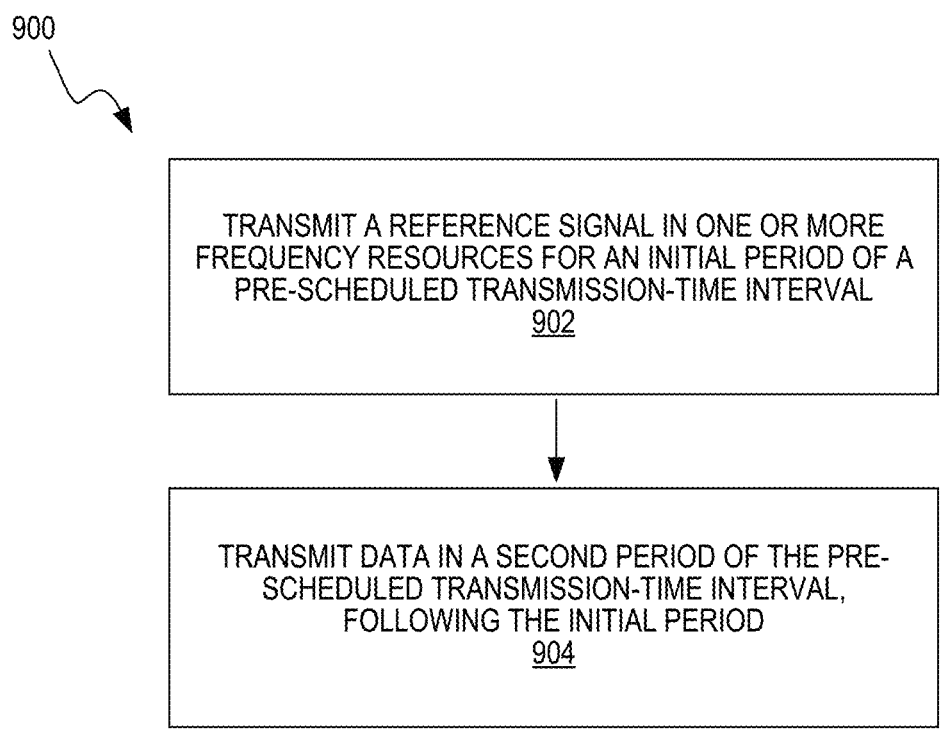
FIG. 9 is a flowchart showing another method in a wireless device, according to some embodiments.

The method of FIG. 8B may include determining that radio-frequency energy for the first transmission resource during the interruption interval exceeds a predetermined threshold and, in response to said determining, refraining from transmitting in the first transmission resource during the third part of the transmission window. In some cases, analyzing the radio-frequency received in the first transmission resource during the interruption interval indicates the presence of clear-to-send signal from another wireless device, and the method may include resuming transmission in the first transmission resource during the third part of the transmission resource, based on said indication The processing circuitry 60 of the UE may, in some embodiments, be configured to perform other methods, such as method 900 of FIG. 9. The method 900 includes transmitting a reference signal in one or more frequency resources for an initial period of a pre-scheduled transmission-time interval (Block 902) and transmitting data in a second period of the pre-scheduled transmission-time interval, following the initial period (Block 904).

Method 900 may include transmitting the reference signal using a first antenna configuration and transmitting the data using a second antenna configuration, the second antenna configuration differing from the first antenna configuration. In some cases, the first antenna configuration is a broadcast configuration and the second antenna configuration is a beam-formed transmission. The second antenna configuration may be a precoded multiple-input multiple-output, MIMO, configuration and the first antenna configuration is a non-precoded configuration. Method 900 may also include selecting the reference signal from one of a set of predetermined reference signals.

Figure 10:
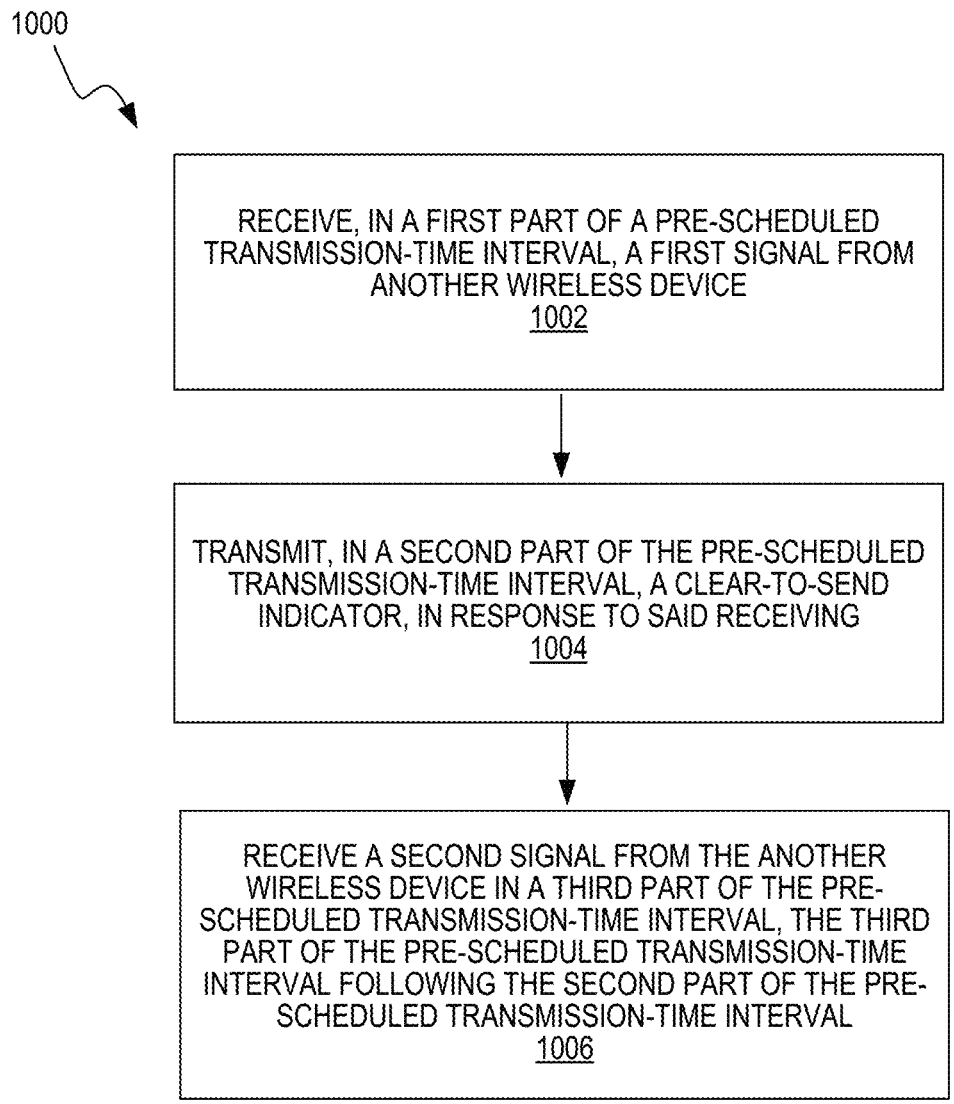
FIG. 10 is a flowchart showing a method in a wireless device, according to some embodiments.
Figure 11:
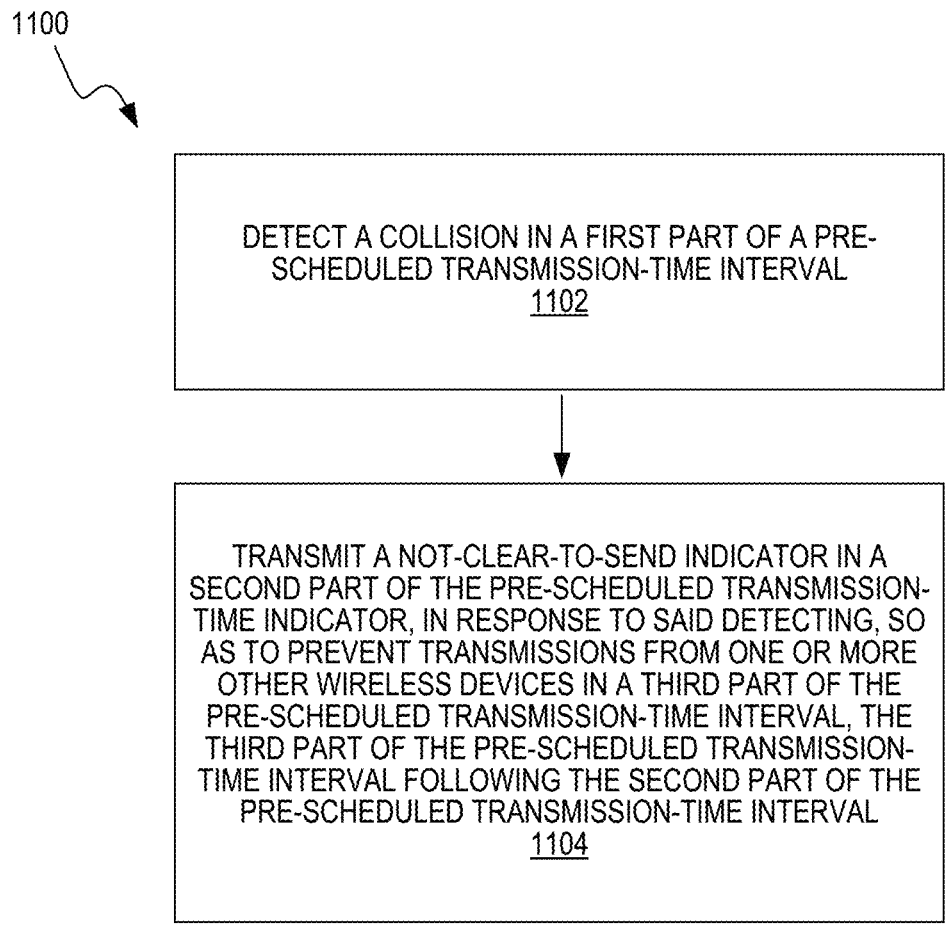
FIG. 11 is a flowchart showing a method in a wireless device, according to some embodiments.

The processing circuitry 60 of the UE 50 may also be configured to perform other methods, such as method 1000 of FIG. 10. The method 1000 includes receiving, in a first part of a pre-scheduled transmission-time interval, a first signal from a second wireless device (Block 1002) and transmitting, in a second part of the pre-scheduled transmission-time interval, a clear-to-send indicator, in response to said receiving (Block 1004). The method 1000 may also include receiving a second signal from the second wireless device in a third part of the pre-scheduled transmission-time interval, the third part of the pre-scheduled transmission-time interval following the second part of the pre-scheduled transmission-time interval (Block 1006).

Another method that can be performed by UE 50 includes method 1100. The method 1100 includes detecting a collision in a first part of a pre-scheduled transmission-time interval (Block 1102). The method 1100 also includes transmitting a not-clear-to-send indicator in a second part of the pre-scheduled transmission-time indicator, in response to said detecting (Block 1104), so as to prevent transmissions from one or more other wireless devices in a third part of the pre-scheduled transmission-time interval, the third part of the pre-scheduled transmission-time interval following the second part of the pre-scheduled transmission-time interval.

Figure 12:
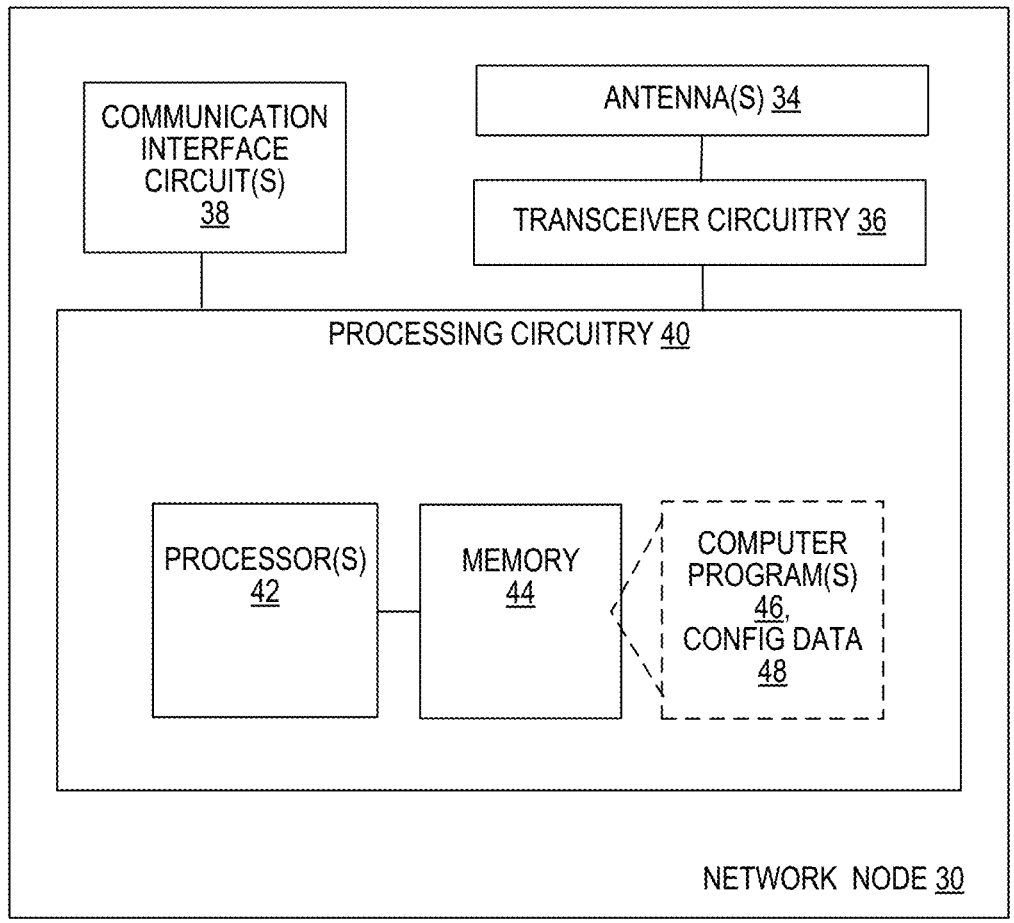
FIG. 12 is a block diagram of a network node, according to some embodiments.

While the UE 50 is given as an example of a wireless device, the techniques could more generally be applied in any direction, between any two radio nodes, including a radio access network node 30 as shown in FIG. 12. The network node 30 may also be configured to perform additional operations.

FIG. 12 illustrates a diagram of another wireless device, such as a radio access network node 30, according to some embodiments. Examples of various types of radio access network nodes 30 are Node B, base station (BS), multi-standard radio (MSR) node such as MSR BS, eNodeB, network controller, radio network controller (RNC), base station controller (BSC), relay, donor node controlling relay, base transceiver station (BTS), access point (AP), transmission points, transmission nodes, RRU, RRH, nodes in distributed antenna system (DAS), etc.

The network node 30 includes one or more communication interface circuits 38 in order to communicate with network nodes or peer nodes. The network node 30 provides an air interface to wireless devices such as UEs, which is implemented via one or more antennas 34 and transceiver circuitry 36. The transceiver circuitry 36 may include transmitter circuits, receiver circuits, and associated control circuits that are collectively configured to transmit and receive signals according to a radio access technology for the purposes of providing communication services. According to various embodiments, the network node 30 can communicate with one or more peer nodes or core network nodes. The transceiver circuitry 36 is configured to communicate using cellular communication services operated according to wireless communication standards (e.g. GSM, GPRS, WCDMA, HSDPA, LTE, LTE-Advanced, 5G, etc.).

The network node 30 also includes processing circuitry 40 that is operatively associated with the communication interface circuit(s) 38 and/or the transceiver circuitry 36. The processing circuitry 40 comprises one or more digital processors 42, e.g., one or more microprocessors, microcontrollers, Digital Signal Processors or DSPs, Field Programmable Gate Arrays or FPGAs, Complex Programmable Logic Devices or CPLDs, Application Specific Integrated Circuits or ASICs, or any combination thereof. More generally, the processing circuitry 40 may comprise fixed circuitry, or programmable circuitry that is specially configured via the execution of program instructions implementing the functionality taught herein, or may comprise some combination of fixed and programmable circuitry. The processor(s) 42 may be multi-core.

The processing circuitry 40 also includes a memory 44. The memory 44, in some embodiments, stores one or more computer programs 46 and, optionally, configuration data 48. The memory 44 provides non-transitory storage for the computer program 46 and it may comprise one or more types of computer-readable media, such as disk storage, solid-state memory storage, or any combination thereof. By way of non-limiting example, the memory 44 may comprise any one or more of SRAM, DRAM, EEPROM, and FLASH memory, which may be in the processing circuitry 40 and/or separate from the processing circuitry 40. In general, the memory 44 comprises one or more types of computer-readable storage media providing non-transitory storage of the computer program 46 and any configuration data 48 used by the node 30.

The network node 30 is configured for performing the methods described herein, including transmitting a positive CTS indicator. For example, the processing circuitry 40 is configured to use the transceiver circuitry 36 to receive, in a first part of a pre-scheduled transmission-time interval, a first signal from another wireless device and transmit, in a second part of the pre-scheduled transmission-time interval, a clear-to-send indicator, in response to said receiving. The processing circuitry 40 is also configured to receive a second signal from a wireless device in a third part of the pre-scheduled transmission-time interval, the third part of the pre-scheduled transmission-time interval following the second part of the pre-scheduled transmission-time interval.

In another example, the network node 30 is configured to transmit a negative CTS indicator. For example, the processing circuitry 40 is configured to use the transceiver circuitry 36 to detect a collision in a first part of a pre-scheduled transmission-time interval and transmit a not-clear-to-send indicator in a second part of the pre-scheduled transmission-time indicator, in response to said detecting, so as to prevent transmissions from one or more wireless devices in a third part of the pre-scheduled transmission-time interval, the third part of the pre-scheduled transmission-time interval following the second part of the pre-scheduled transmission-time interval.

Although the techniques and apparatus described herein are expected to be used in 5G systems, terminology used in the specification of LTE systems may be used herein, for convenience. It will be understood that other names may apply to the same or similar parameters, channels, etc. It should also be appreciated that the techniques and apparatus described herein may be designed for backwards compatibility with LTE and/or other systems, but are not necessarily so. Embodiments of the presently disclosed techniques and apparatus are applicable also to single-carrier as well as to multicarrier (MC) or carrier aggregation (CA) operation of the UE.

Figure 13:
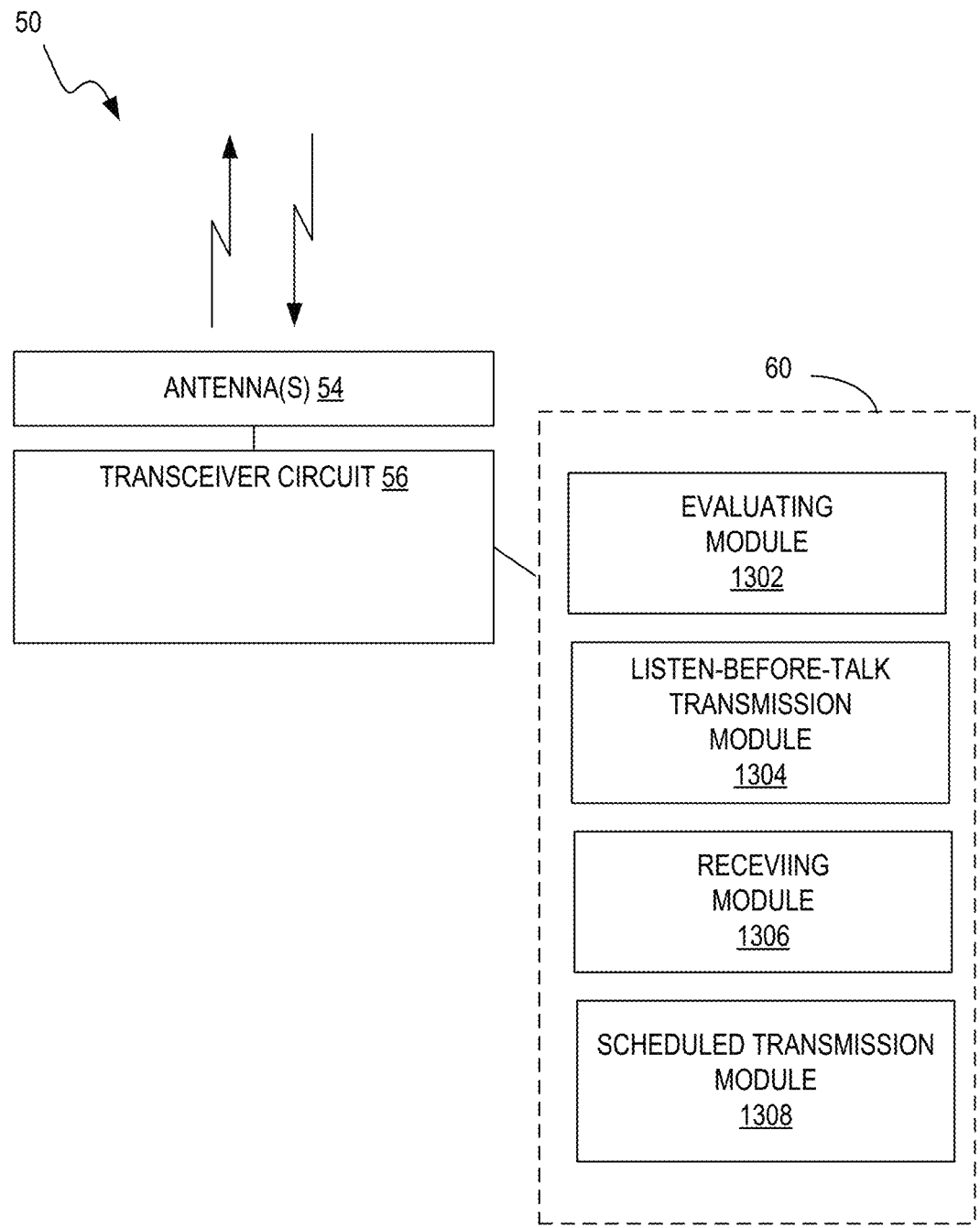
FIG. 13 is a functional implementation of a wireless device, according to some embodiments.

FIG. 13 illustrates an example functional module or circuit architecture as may be implemented in a wireless device, such as UE 50, e.g., based on the processing circuitry 60, where the wireless device is configured with a plurality of channel-sensing resources, each channel-sensing resource being associated with one or more corresponding transmission resources. The illustrated embodiment at least functionally includes: an evaluating module (1302) for evaluating, in response to a determination that first data is ready to be transmitted by the wireless device (50), whether one or more of the plurality of channel-sensing resources are occupied, and for detecting that at least one of the plurality of channel-sensing resources is not occupied; a listen-before-talk transmission module (1304) for transmitting at least a part of the first data on at least one transmission resource associated with the at least one channel-sensing resource, in response to said detecting; a receiving module (1306) for receiving a grant for a scheduled transmission at least partly overlapping with at least one of the plurality of channel-sensing resources, subsequently to said evaluating, determining, and transmitting; and a scheduled transmission module (1308) for transmitting second data in accordance with the received grant.

Figure 14:
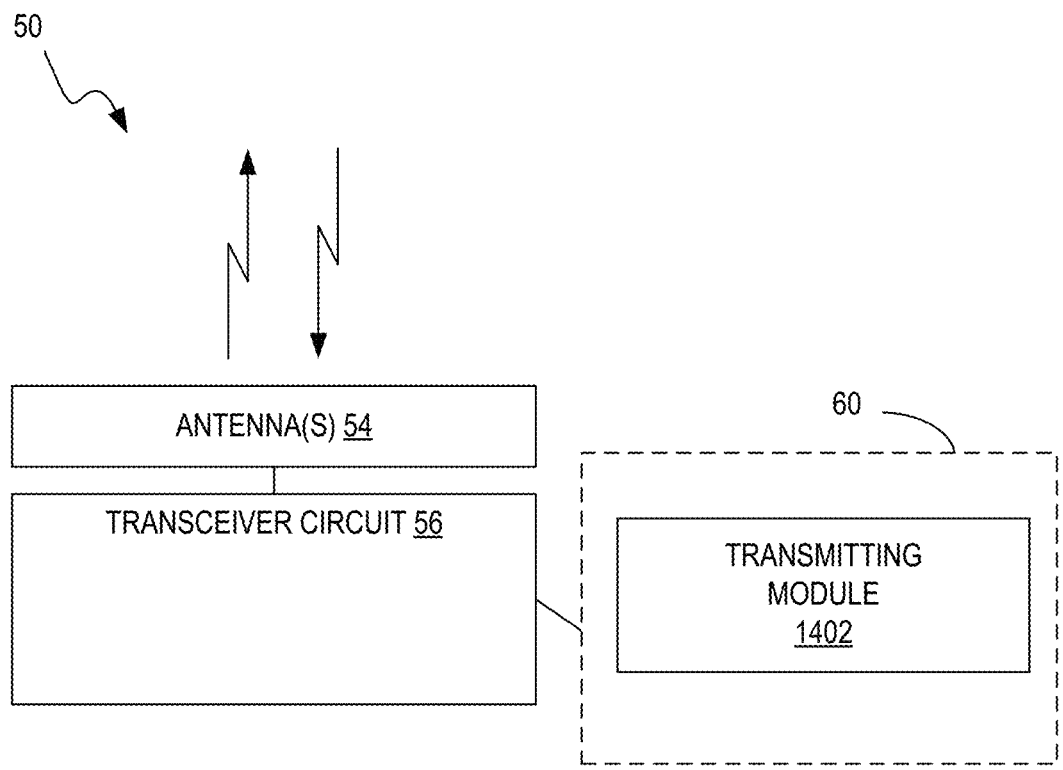
FIG. 14 is a functional implementation of a wireless device, according to some embodiments.

FIG. 14 shows another functional module or circuit architecture as may be implemented in a wireless device, such as UE 50. The illustrated embodiment includes a transmitting module 1402 for transmitting a reference signal in one or more frequency resources for an initial period of a pre-scheduled transmission-time interval and transmitting data in a second period of the pre-scheduled transmission-time interval, following the initial period.

Figure 15:
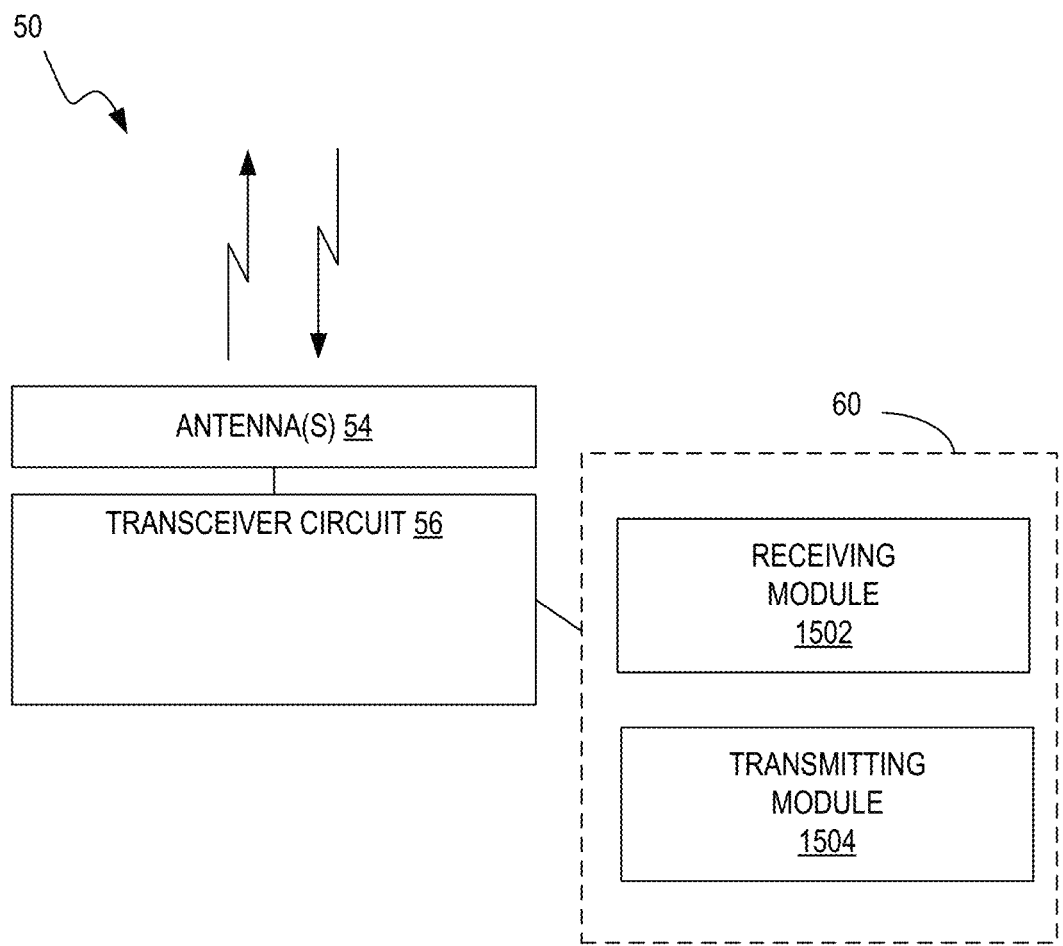
FIG. 15 is a functional implementation of a wireless device, according to some embodiments.

FIG. 15 shows a functional module or circuit architecture as may be implemented in a wireless device, such as UE 50. The illustrated embodiment includes a receiving module 1502 for receiving, in a first part of a pre-scheduled transmission-time interval, a first signal from a second wireless device and a transmitting module 1504 for transmitting, in a second part of the pre-scheduled transmission-time interval, a clear-to-send indicator, in response to said receiving. The receiving module 1502 is also for receiving a second signal from the second wireless device in a third part of the pre-scheduled transmission-time interval, the third part of the pre-scheduled transmission-time interval following the second part of the pre-scheduled transmission-time interval.

Figure 16:
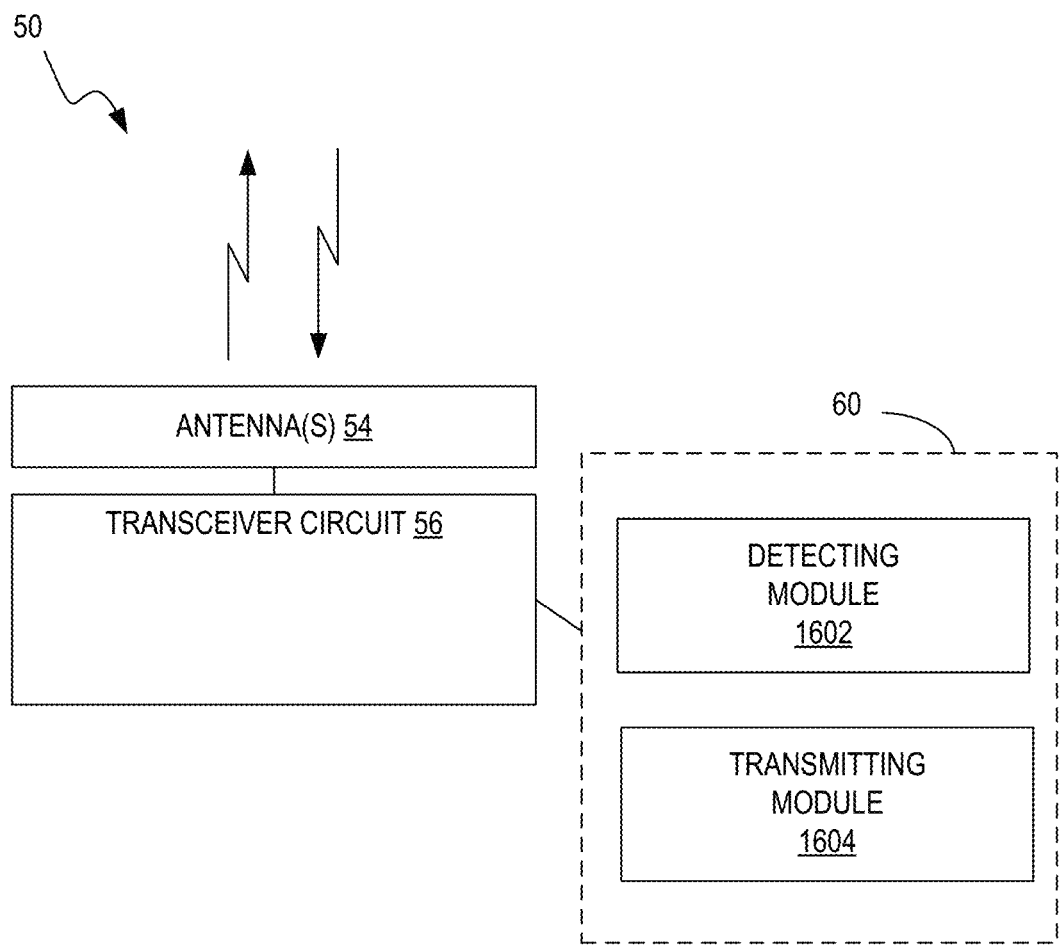
FIG. 16 is a functional implementation of a wireless device, according to some embodiments.

FIG. 16 shows a functional module or circuit architecture as may be implemented in a wireless device, such as UE 50. The illustrated embodiment includes a detecting module 1602 for detecting a collision in a first part of a pre-scheduled transmission-time interval, and a transmitting module 1604 for transmitting a not-clear-to-send indicator in a second part of the pre-scheduled transmission-time indicator, in response to said detecting, so as to prevent transmissions from one or more other wireless devices in a third part of the pre-scheduled transmission-time interval, the third part of the pre-scheduled transmission-time interval following the second part of the pre-scheduled transmission-time interval.

Figure 17:
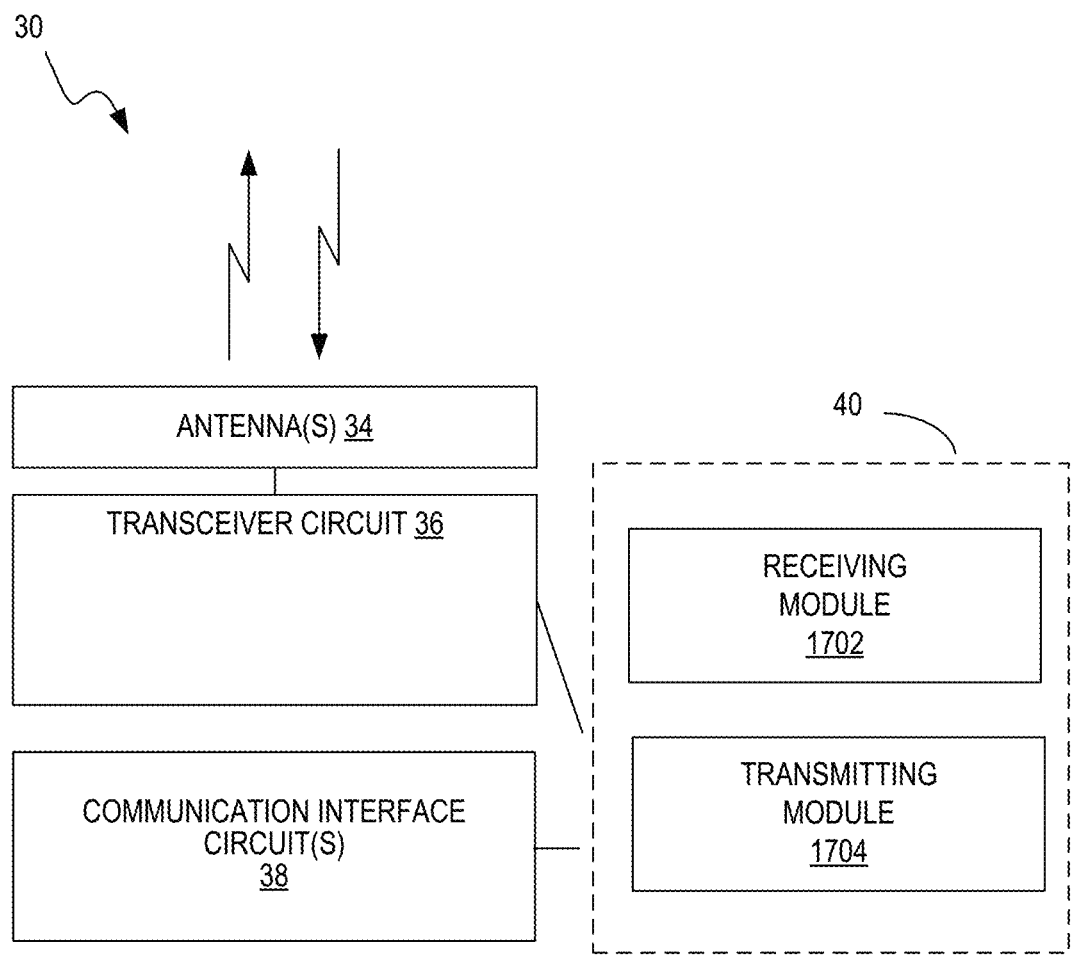
FIG. 17 is a functional implementation of a network node, according to some embodiments.

FIG. 17 illustrates an example functional module or circuit architecture as may be implemented in a base station, such as network node 30, e.g., based on the processing circuitry 40. The illustrated embodiment at least functionally includes a receiving module 1702 for receiving, in a first part of a pre-scheduled transmission-time interval, a first signal from a second wireless device and a transmitting module 1704 for transmitting, in a second part of the pre-scheduled transmission-time interval, a clear-to-send indicator, in response to said receiving. The receiving module 1702 is also for receiving a second signal from the second wireless device in a third part of the pre-scheduled transmission-time interval, the third part of the pre-scheduled transmission-time interval following the second part of the pre-scheduled transmission-time interval.

Figure 18:
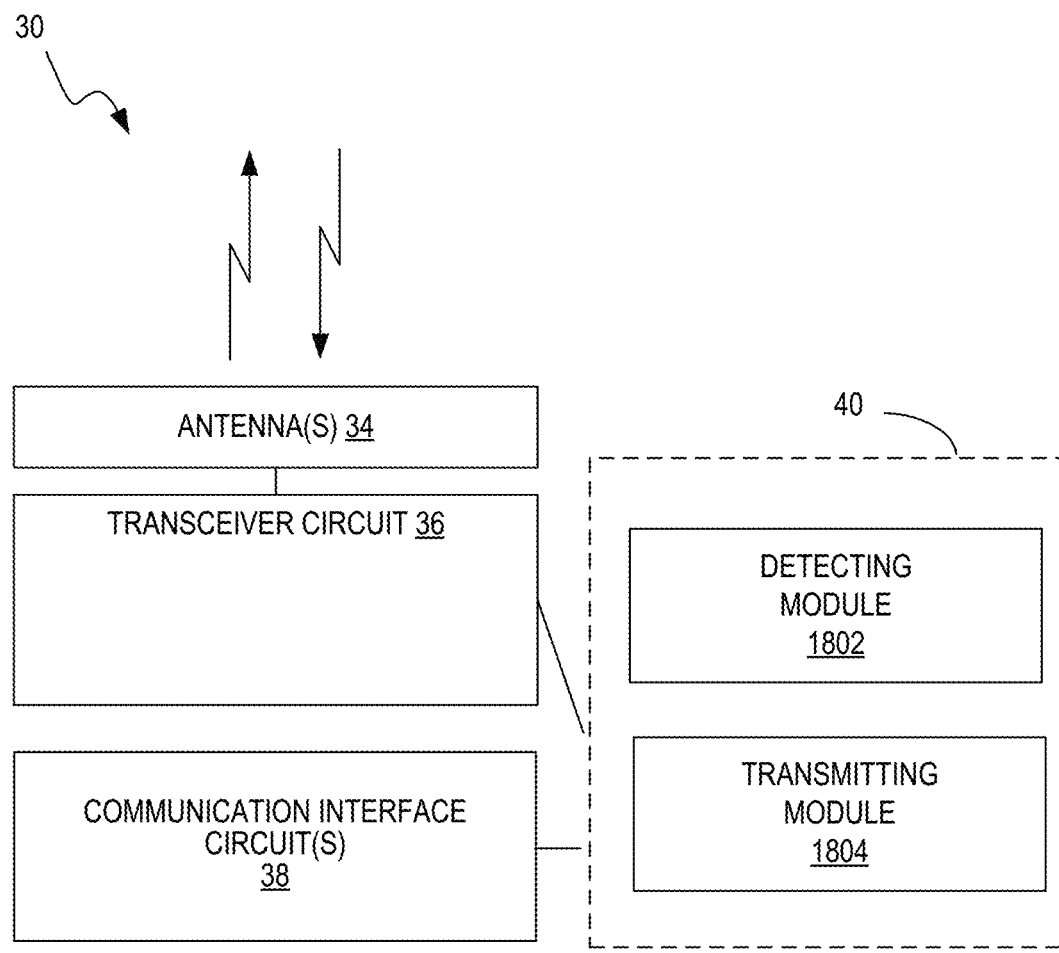
FIG. 18 is a functional implementation of a network node, according to some embodiments.

FIG. 18 illustrates another example functional module or circuit architecture as may be implemented in a base station, such as network node 30. The illustrated embodiment at least functionally includes a detecting module 1802 for detecting a collision in a first part of a pre-scheduled transmission-time interval, and a transmitting module 1804 for transmitting a not-clear-to-send indicator in a second part of the pre-scheduled transmission-time indicator, in response to said detecting, so as to prevent transmissions from one or more other wireless devices in a third part of the pre-scheduled transmission-time interval, the third part of the pre-scheduled transmission-time interval following the second part of the pre-scheduled transmission-time interval.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method, in a wireless device, wherein the wireless device is configured with a plurality of channel-sensing resources, each channel-sensing resource being associated with at least one corresponding transmission resource, the method comprising:

evaluating, in response to a determination that first data is ready to be transmitted by the wireless device, whether one or more of the plurality of channel-sensing resources are occupied by correlating a signal received during a channel-sensing period with a reference signal, wherein energy corresponding to the reference signal is removed and residual energy corresponding to the received signal is compared to a predetermined threshold;

determining a duration of the channel-sensing resources based at least in part on a result from a previous attempt to determine whether one or more other wireless devices were transmitting during an earlier transmission-time interval;

detecting that at least one of the plurality of channel-sensing resources is not occupied based on the comparison;

transmitting at least a part of the first data on at least one transmission resource associated with the at least one channel-sensing resource, based on said detecting, wherein radio-frequency energy received during an interruption interval that begins after the transmission of at least the part of the first data, is analyzed and transmission of a second part of the first data is resumed or deferred, based on the analyzed radio-frequency energy received during the interruption interval;

receiving a grant for a scheduled transmission at least partly overlapping with at least one of said plurality of channel-sensing resources, subsequently to said evaluating, detecting, and transmitting; and transmitting second data in accordance with the received grant, wherein said evaluating comprises analyzing radio-frequency energy received in a first one of the one or more channel-sensing resources during a first analysis period, having a first duration, and wherein the method further comprises: analyzing, in a pre-scheduled transmission time interval, radio-frequency energy received in a second one of the one or more channel-sensing resources during a second analysis period overlapping the first analysis period and having a second duration; and transmitting at least the part of the first data on a second transmission resource, corresponding to second one of the one or more channel-sensing resources, in response to determining, based on the analyzing of the radio-frequency energy received in the second one of the one or more channel-sensing resources, that the second one of the one or more channel-sensing resources is not occupied.

2. The method of claim 1, wherein evaluating whether one or more of the plurality of channel-sensing resources are occupied comprises analyzing radio-frequency energy received in the one or more of the plurality of channel-sensing resources, and wherein said detecting is based on said analyzing.

3. The method of claim 2, wherein analyzing radio-frequency energy received in the one or more of the plurality of channel-sensing resources comprises comparing radio-frequency energy received in each channel-sensing resource to a predetermined threshold and detecting that at least one of plurality of channel-sensing resources is not occupied by determining that radio-frequency energy received in the at least one of the one or more of the frequency resources is less than the predetermined threshold.

4. The method of claim 3, wherein analyzing radio-frequency energy received in the one or more of the plurality of channel-sensing resources comprises correlating a signal received in a first channel-sensing resource against a first predetermined reference signal, and wherein the method further comprises omitting received radio-frequency energy corresponding to the first predetermined reference signal when comparing received radio-frequency energy for the first channel-sensing resource to the predetermined threshold.

5. The method of claim 4, wherein analyzing radio-frequency energy received in the one or more of the plurality of channel-sensing resources comprises:

correlating a signal received in the first channel-sensing resource against each of one or more predetermined reference signals;

removing signal energy corresponding to one or more of the predetermined reference signals from the signal received in the first channel-sensing resource, based on the correlating, to obtain a residual signal; and comparing the energy in the residual signal to the predetermined threshold;

wherein said detecting is based on the comparing of the energy in the residual signal to the predetermined threshold.

6. The method of claim 2, wherein analyzing radio-frequency energy received in the one or more of the plurality of channel-sensing resources comprises correlating a signal received in a channel-sensing resource against a second predetermined reference signal, wherein said detecting comprises determining the absence of the second predetermined reference signal, based on said correlating.

7. The method of claim 1, further comprising, prior to said evaluating, determining a duration of the channel-sensing resources based at least in part on received configuration information.

8. The method of claim 1, further comprising determining a duration of the channel-sensing resources based at least in part on a type of data to be transmitted by the wireless device.

9. The method of claim 1, further comprising determining a duration of the channel-sensing resources based at least in part on a timing advance parameter for the wireless device.

10. The method of claim 1, wherein the first and second durations differ.

11. The method of claim 1, wherein said transmitting at least a part of the first data on at least one transmission resource associated with the at least one channel-sensing resource comprises transmitting in a first transmission resource during a first part of the first transmission resource, and wherein the method further comprises:

ceasing transmission in the first transmission resource a pre-determined interval after the first part of the first transmission resource begins;

analyzing radio-frequency energy received in the first transmission resource during the interruption interval that begins after said ceasing; and selectively resuming transmission or refraining from transmitting in the first transmission resource during a third part of the first transmission resource, based on the analyzing of radio-frequency received in the first transmission resource during the interruption interval.

12. The method of claim 11, further comprising determining that radio-frequency energy for the first transmission resource during the interruption interval exceeds a predetermined threshold and, in response to said determining, refraining from transmitting in the first transmission resource during the third part of the transmission resource.

13. The method of claim 11, wherein said analyzing of the radio-frequency received in the first transmission resource during the interruption interval indicates the presence of clear-to-send signal from another wireless device, and wherein the method comprises resuming transmission in the first transmission resource during the third part of the transmission resource, based on said indication.

14. A wireless device, comprising:

transceiver circuitry configured to send and receive transmissions; and processing circuitry configured to control the transceiver circuitry and configured with a plurality of channel-sensing resources, each channel-sensing resource being associated with one or more corresponding transmission resources, wherein the processing circuitry is configured to:

evaluate, in response to a determination that first data is ready to be transmitted by the wireless device, whether one or more of the plurality of channel-sensing resources are occupied by correlating a signal received during a channel-sensing period with a reference signal, wherein energy corresponding to the reference signal is removed and residual energy is compared to a predetermined threshold;

determine a duration of the channel-sensing resources based at least in part on a result from a previous attempt to determine whether one or more other wireless devices were transmitting during an earlier transmission-time interval;

detect that at least one of the plurality of channel-sensing resources is not occupied based on the comparison;

transmit at least a part of the first data on at least one transmission resource associated with the at least one channel-sensing resource, in response to said detecting, wherein radio-frequency energy received during an interruption interval that begins after the transmission of at least the part of the first data, is analyzed and transmission of a second part of the first data is resumed or deferred, based on the analyzed radio-frequency energy received during the interruption interval;

receive a grant for a scheduled transmission at least partly overlapping with at least one of the plurality of channel-sensing resources, subsequently to said evaluating, detecting, and transmitting; and transmit second data in accordance with the received grant, wherein the processing circuitry is configured to perform said evaluating by analyzing radio-frequency energy received in the first one of the one or more channel-sensing resources during a first analysis period, having a first duration, and wherein the processing circuitry is further configured to:

analyze, in a pre-scheduled transmission time interval, radio-frequency energy received in a second one of the one or more channel-sensing resources during a second analysis period overlapping the first analysis period and having a second duration; and transmit at least the part of the first data on a second transmission resource, corresponding to the second one of the one or more channel-sensing resources, in response to determining, based on the analyzing of the radio-frequency energy received in the second one of the one or more channel-sensing resources, that the second one of the one or more channel-sensing resources is not occupied.

15. The wireless device of claim 14, wherein the processing circuitry is configured to evaluate whether one or more of the plurality of channel-sensing resources are occupied by analyzing radio-frequency energy received in the one or more of the plurality of channel-sensing resources.

16. The wireless device of claim 15, wherein the processing circuitry is configured to compare radio-frequency energy received in each of the one or more of the plurality of channel-sensing resources to a predetermined threshold and determine that at least one of the one or more channel-sensing resources is not occupied by determining that received radio-frequency energy in the at least one of the channel-sensing resources is less than the predetermined threshold.

17. The wireless device of claim 16, wherein the processing circuitry is configured to:

correlate a signal received in a first channel-sensing resource against a first predetermined reference signal; and omit received radio-frequency energy corresponding to the first predetermined reference signal when comparing radio-frequency energy received in the first channel-sensing resource to the predetermined threshold.

18. The wireless device of claim 17, wherein the processing circuitry is configured to:

correlate a signal received in the first channel-sensing resource against each of one or more predetermined reference signals;

remove signal energy corresponding to one or more of the predetermined reference signals from the received signal, based on the correlating, to obtain a residual signal;

compare the energy in the residual signal to the predetermined threshold; and transmit in the first channel-sensing resource based on the comparing of the energy in the residual signal to the predetermined threshold.

19. The wireless device of claim 14, wherein the processing circuitry is configured to:

correlate a signal received in a second channel-sensing resource against a second predetermined reference signal; and transmit in the second channel-sensing resource in response to determining the absence of the second predetermined reference signal, based on said correlation.

20. The wireless device of claim 14, wherein the processing circuitry is configured to, prior to said analyzing, determine a duration of the channel-sensing resources based at least in part on received configuration information.

21. The wireless device of claim 14, wherein the processing circuitry is configured to determine a duration of the channel-sensing resources based at least in part on a type of data to be transmitted by the wireless device.

22. The wireless device of claim 14, wherein the processing circuitry is configured to determine a duration of the channel sensing resources based at least in part on a timing advance parameter for the wireless device.

23. The wireless device of claim 14, wherein the first and second durations differ.

* * * * *